US011250544B2

(12) United States Patent
Jang et al.

(10) Patent No.: US 11,250,544 B2
(45) Date of Patent: Feb. 15, 2022

(54) DISPLAY DEVICE FOR VISUALIZING CONTENTS AS THE DISPLAY IS ROTATED AND CONTROL METHOD THEREOF

(71) Applicant: SAMSUNG ELECTRONICS CO., LTD., Suwon-si (KR)

(72) Inventors: Sung-hyun Jang, Seoul (KR); Min-sun Park, Seoul (KR); Ji-hye Lim, Seoul (KR); Ji-Youn Han, Seoul (KR); Soo-hyun Whang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/100,932

(22) Filed: Aug. 10, 2018

(65) Prior Publication Data

US 2019/0050964 A1     Feb. 14, 2019

Related U.S. Application Data

(60) Provisional application No. 62/544,300, filed on Aug. 11, 2017, provisional application No. 62/544,215, filed on Aug. 11, 2017.

(30) Foreign Application Priority Data

Dec. 12, 2017   (KR) .................... 10-2017-0170736

(51) Int. Cl.
*G06T 3/60*      (2006.01)
*G06F 3/0484*    (2013.01)
(Continued)

(52) U.S. Cl.
CPC .............. *G06T 3/60* (2013.01); *G06F 3/0484* (2013.01); *G06F 3/0488* (2013.01);
(Continued)

(58) Field of Classification Search
CPC ....... G06T 3/60; G06F 3/0484; G06F 3/0488; G06F 3/023; G06F 3/03547;
(Continued)

(56) References Cited

U.S. PATENT DOCUMENTS 4,992,959 A * 2/1991 Hamada ............... G06K 15/128
                                                358/1.11
9,317,899 B2 * 4/2016 Sakai ................. H04N 21/4312
(Continued)

FOREIGN PATENT DOCUMENTS

JP      11-95763 A      4/1999
JP      2006-259358 A   9/2006
(Continued)

OTHER PUBLICATIONS

International Search Report (PCT/ISA/210) dated Nov. 13, 2018 issued by the International Searching Authority in International Application No. PCT/KR2018/008838.
(Continued)

*Primary Examiner* — Chante E Harrison
(74) *Attorney, Agent, or Firm* — Sughrue Mion, PLLC

(57) ABSTRACT

A display device and a controlling method thereof are provided. The display device includes: displaying a plurality of objects on a rotatable display of the display device; based on an event occurring, rotating the rotatable display in a first direction; and based on the rotatable display being rotated in the first direction, rotating and displaying constituent elements included in the plurality of objects in a second direction, which is opposite to the first direction, while maintaining an arrangement of the plurality of objects.

16 Claims, 18 Drawing Sheets

(51) Int. Cl.
*G06F 3/0488* (2013.01)
*H04N 21/472* (2011.01)
*H04N 21/426* (2011.01)
*H04N 21/431* (2011.01)
*H04N 21/442* (2011.01)

(52) U.S. Cl.
CPC ....... *G06F 3/04845* (2013.01); *H04N 21/426* (2013.01); *H04N 21/4312* (2013.01); *H04N 21/4318* (2013.01); *H04N 21/44218* (2013.01); *H04N 21/47205* (2013.01)

(58) Field of Classification Search
CPC ........... G06F 2203/0383; G06F 3/0346; G06F 2200/1637; G06F 2200/1612; G06F 2200/1614; H04N 21/4312; H04N 21/47205; H04N 21/485; H04N 5/655; H04N 5/4403; F16M 11/10; F16M 11/18; F16M 11/2014; F16M 11/046; F16M 11/105; F16M 2200/0042; G09G 5/003; G09G 2354/00; G09G 5/38; G09G 2340/0492; G09G 2356/00; F16H 19/001
See application file for complete search history.

(56) References Cited

U.S. PATENT DOCUMENTS

| | | | |
|---|---|---|---|
| 9,424,798 B2 | 8/2016 | Park | |
| 9,628,744 B2 | 4/2017 | Phang et al. | |
| 9,721,375 B1* | 8/2017 | Rivard | G06T 13/80 |
| 10,055,115 B2* | 8/2018 | Choi | G06F 3/0488 |
| 2005/0270396 A1* | 12/2005 | Miyashita | G02F 1/13452 |
| | | | 348/333.01 |
| 2008/0110322 A1 | 5/2008 | Lee et al. | |
| 2008/0236014 A1* | 10/2008 | Chao | F16M 11/105 |
| | | | 40/747 |
| 2009/0002391 A1* | 1/2009 | Williamson | G06F 3/04845 |
| | | | 345/619 |
| 2009/0070375 A1 | 3/2009 | Choi | |
| 2009/0083281 A1 | 3/2009 | Sarig et al. | |
| 2010/0066763 A1* | 3/2010 | Macdougall | G06F 1/1626 |
| | | | 345/656 |
| 2010/0097448 A1* | 4/2010 | Gilbert | B60K 35/00 |
| | | | 348/51 |
| 2010/0295782 A1* | 11/2010 | Binder | G01S 3/7864 |
| | | | 345/158 |
| 2011/0059775 A1* | 3/2011 | Choi | G06F 1/1694 |
| | | | 455/566 |
| 2012/0056830 A1* | 3/2012 | Suzuki | G06F 1/1626 |
| | | | 345/173 |
| 2012/0268391 A1* | 10/2012 | Somers | G06F 3/04886 |
| | | | 345/173 |
| 2013/0021377 A1 | 1/2013 | Doll | |
| 2013/0161454 A1* | 6/2013 | Matsuoka | F16M 11/105 |
| | | | 248/122.1 |
| 2013/0169981 A1* | 7/2013 | Takahashi | G06F 3/1205 |
| | | | 358/1.9 |
| 2013/0181948 A1* | 7/2013 | Sakai | G06F 3/0425 |
| | | | 345/175 |
| 2013/0182014 A1 | 7/2013 | Park | |
| 2013/0203462 A1* | 8/2013 | Tahk | G06F 3/04845 |
| | | | 455/556.1 |
| 2014/0049563 A1* | 2/2014 | Tobin | G06F 3/012 |
| | | | 345/649 |
| 2014/0081796 A1 | 3/2014 | Cohen | |
| 2014/0210860 A1 | 7/2014 | Caissy | |
| 2014/0333671 A1* | 11/2014 | Phang | H04N 21/4316 |
| | | | 345/659 |
| 2014/0337892 A1 | 11/2014 | Phang et al. | |
| 2014/0358981 A1* | 12/2014 | Miyake | H04L 67/1095 |
| | | | 709/201 |
| 2015/0084878 A1* | 3/2015 | Kim | G06F 3/016 |
| | | | 345/173 |
| 2015/0084881 A1* | 3/2015 | Yu | G06F 1/1694 |
| | | | 345/173 |
| 2015/0116363 A1* | 4/2015 | Monte | G06F 40/103 |
| | | | 345/659 |
| 2015/0193912 A1* | 7/2015 | Yuasa | G06F 3/14 |
| | | | 345/659 |
| 2015/0213580 A1* | 7/2015 | Yamano | G06F 3/0346 |
| | | | 345/649 |
| 2015/0339047 A1 | 11/2015 | Lee et al. | |
| 2016/0035323 A1 | 2/2016 | Na et al. | |
| 2016/0048305 A1 | 2/2016 | Singal et al. | |
| 2016/0070460 A1* | 3/2016 | Gradert | G06F 3/04883 |
| | | | 715/771 |
| 2016/0071241 A1 | 3/2016 | Karunamuni et al. | |
| 2016/0077592 A1* | 3/2016 | Bhesania | G06F 3/011 |
| | | | 345/650 |
| 2016/0302315 A1 | 10/2016 | Choi et al. | |
| 2016/0313781 A1* | 10/2016 | Jeon | G06F 1/3265 |
| 2017/0097692 A1* | 4/2017 | Furukawa | G06T 3/60 |
| 2017/0131789 A1* | 5/2017 | Shim | G06F 3/033 |
| 2018/0146224 A1* | 5/2018 | Park | H04N 21/23439 |
| 2018/0199001 A1* | 7/2018 | Lim | H04N 21/4104 |
| 2019/0040992 A1* | 2/2019 | Ikemoto | G09F 9/00 |
| 2019/0333479 A1* | 10/2019 | Maalouf | G09G 5/38 |

FOREIGN PATENT DOCUMENTS

| | | |
|---|---|---|
| JP | 2010-128140 A | 6/2010 |
| JP | 2014-098564 A | 5/2014 |
| KR | 10-2008-0043129 A | 5/2008 |
| KR | 10-0847475 B1 | 7/2008 |
| KR | 10-0850891 B1 | 8/2008 |
| KR | 10-2008-0102859 A | 11/2008 |
| KR | 10-2009-0080890 A | 7/2009 |
| KR | 10-1080046 B1 | 11/2011 |
| KR | 10-1138396 B1 | 4/2012 |
| KR | 10-1366861 B1 | 2/2014 |
| KR | 10-2014-0096523 A | 8/2014 |
| KR | 10-2014-0133357 A | 11/2014 |
| KR | 1020140133363 A | 11/2014 |
| KR | 10-2014-0146488 A | 12/2014 |
| KR | 10-2016-0015727 A | 2/2016 |
| KR | 10-2016-0121652 A | 10/2016 |
| KR | 10-1708648 B1 | 2/2017 |
| KR | 1020170042350 A | 4/2017 |
| KR | 10-1749393 B1 | 6/2017 |
| KR | 10-1768974 B1 | 8/2017 |
| WO | 2010030985 A1 | 3/2010 |
| WO | 2016025418 A1 | 2/2016 |

OTHER PUBLICATIONS

Written Opinion (PCT/ISA/237) dated Nov. 13, 2018 issued by the International Searching Authority in International Application No. PCT/KR2018/008838.
Communication dated Feb. 3, 2020, issued by the European Patent Office in counterpart European Application No. 18844368.3.
Communication dated Sep. 21, 2020 issued by the European Patent Office in European Application No. 18844368.3.
Communication dated Dec. 15, 2020 by the Japanese Patent Office in Japanese Patent Application No. 2020-503062.
Communication dated Apr. 16, 2021 issued by the Korean Intellectual Property Office in Korean English Application No. 1020170170736 Translation.
Communication dated Jul. 29, 2021 issued by the Indian Patent Office in Indian Application No. 201947044549.
Communication dated Aug. 31, 2021 issued by the Japanese Patent Office in Japanese Application No. 2020-503062.
Communication dated Sep. 7, 2021 issued by the European Patent Office in European Application No. 18 844 368.3.
Communication dated Oct. 12, 2021 issued by the Korean Intellectual Property Office in Korean Application No. 10-2017-0170736.

\* cited by examiner (a)

(b)

(d)

(c)

(a)

(b)

(c)

DISPLAY DEVICE FOR VISUALIZING CONTENTS AS THE DISPLAY IS ROTATED AND CONTROL METHOD THEREOF

CROSS-REFERENCE TO RELATED APPLICATIONS

This application is based on and claims priority under 35 U.S.C. § 119 to U.S. Provisional Application No. 62/544, 215, filed on Aug. 11, 2017, and U.S. Provisional Application No. 62/544,300, filed on Aug. 11, 2017, in the United States Patent and Trademark Office, and Korean Patent Application No. 10-2017-0170736, filed on Dec. 12, 2017, in the Korean Intellectual Property Office, the disclosures of which are incorporated herein by reference in their entireties.

BACKGROUND

Field

The disclosure relates to a display device and a controlling method thereof, and more particularly, to a display device providing a user with a viewing experience where a user's eye gaze is focused by maintaining a direction of displaying contents even when a display is rotated, and a controlling method thereof.

Description of Related Art

A display device typically has a rectangular shape where a horizontal length and a vertical length are different from each other. However, recently, horizontally or vertically elongated contents are provided.

Therefore, in a related art display device, a user must rotate a display to view a horizontal content image on a vertically oriented display device or a vertical content image on a horizontally oriented display device.

In this regard, a user cannot maintain a focused gaze with respect to a content because the content and display rotate together. Therefore, a user cannot continuously view the image of the content.

Therefore, a method is needed for providing a displayed image while maintaining focus of a user's gaze.

SUMMARY

Provided are a display device and a controlling method thereof which provide a user with a viewing experience where a user's gaze is focused because an orientation of displayed contents is fixed while the display is rotated.

In accordance with an aspect of the disclosure, there is provided method of controlling a display device including a rotatable display, the method including: displaying a plurality of objects on the rotatable display; based on an event occurring, rotating the rotatable display in a first direction; and based on the rotatable display being rotated in the first direction, rotating and displaying constituent elements included in the plurality of objects in a second direction, which is opposite to the first direction, while maintaining an arrangement of the plurality of objects.

The displaying may include, based on the rotatable display being rotated in the first direction, rotating and displaying at least a part of the constituent elements respectively included in the plurality of objects in the second direction at a same speed as a rotation speed of the rotatable display.

The displaying may include, based on the rotatable display being rotated in the first direction, fading out the constituent elements respectively included in the plurality of objects, and fading in a new constituent element to at least one object of the plurality of objects.

The displaying may include, based on the event occurring while at least one object of the plurality of objects is highlighted, rotating the rotatable display in the first direction by a predetermined angle while maintaining the at least one object of the plurality of objects to be highlighted.

The displaying may include: based on an object of the plurality of objects being selected, displaying a first screen with respect to a selected object; based on the event occurring while the first screen is displayed, rotating the rotatable display in the first direction by a predetermined angle; and based on the rotatable display being rotated in the first direction, fading out the first screen and fading in a second screen with respect to the selected object.

The displaying may include fading out display of the first screen while rotating in the second direction, and fading in display of the second screen while rotating in the second direction.

The method may further include: based on an object of the plurality of objects being selected, displaying a first screen with respect to the selected object; based on the event occurring while the first screen is displayed, rotating the rotatable display in the first direction by a predetermined angle; and based on the rotatable display being rotated in the first direction, rotating the first screen in the second direction, removing a part of the first screen, and adding a new area to the first screen.

The method may further include, based on the selected object being a music related content, outputting a music source related to the music related content, wherein one of the first screen and the second screen includes at least one of an album cover, an artist picture and lyrics associated with the music related content, and wherein another one of the first screen and the second screen includes an image content associated with the music related content.

The method may further include, based on a user input not being sensed during a predetermined period of time while the plurality of objects are rotated and displayed in the first direction, rotating the rotatable display in the second direction, and changing a mode of the display device to a sleep mode.

The rotating may include rotating the rotatable display 90 degrees.

In accordance with an aspect of the disclosure, there is provided display device including: a rotatable display; a rotation controller; and a processor configured to: control the rotatable display to display a plurality of objects, based on an event occurring, control the rotation controller to rotate the rotatable display in a first direction, and based on the rotatable display being rotated in the first direction, control the rotatable display to rotate and display constituent elements included in the plurality of objects in a second direction, which is opposite to the first direction, while maintaining an arrangement of the plurality of objects.

The processor may be further configured to, based on the rotatable display being rotated in the first direction, control the rotatable display to rotate and display at least a part of the constituent elements respectively included in the plurality of objects in the second direction at a speed same as a rotation speed of the rotatable display.

The processor may be further configured to, based on the display being rotated in the first direction, control the rotatable display to fade out display of a part of the constituent elements respectively included in the plurality of objects, and fade in display of a new constituent element to at least one object of the plurality of objects.

The processor may be further configured to, based on the event occurring while at least one object of the plurality of objects is highlighted, control the rotation controller to rotate the rotatable display in the first direction by a predetermined angle while maintaining the at least one object of the plurality of objects to be highlighted.

The processor may be further configured to, based on an object of the plurality of objects being selected, control the rotatable display to display a first screen with respect to the selected object, based on the event occurring while the first screen is displayed, control the rotation controller to rotate the display in the first direction by a predetermined angle, and based on the rotatable display being rotated in the first direction, control the rotatable display to fade out display of the first screen and fade in display of a second screen with respect to the selected object.

In accordance with an aspect of the disclosure, there is provided a non-transitory computer readable recording medium having embodied thereon a program, which when executed by a processor of a display device including a rotatable display, causes the display device to execute a method including: displaying a plurality of objects on the rotatable display; based on an event occurring, rotating the rotatable display in a first direction; and based on the rotatable display being rotated in the first direction, rotating and displaying constituent elements included in the plurality of objects in a second direction, which is opposite to the first direction, while maintaining an arrangement of the plurality of objects.

The displaying may include, based on the rotatable display being rotated in the first direction, rotating and displaying at least a part of the constituent elements respectively included in the plurality of objects in the second direction at a same speed as a rotation speed of the rotatable display.

The displaying may include, based on the rotatable display being rotated in the first direction, fading out the constituent elements respectively included in the plurality of objects, and fading in a new constituent element to at least one object of the plurality of objects.

The displaying may include, based on the event occurring while at least one object of the plurality of objects is highlighted, rotating the rotatable display in the first direction by a predetermined angle while maintaining the at least one object of the plurality of objects to be highlighted.

The displaying may include: based on an object of the plurality of objects being selected, displaying a first screen with respect to a selected object; based on the event occurring while the first screen is displayed, rotating the rotatable display in the first direction by a predetermined angle; and based on the rotatable display being rotated in the first direction, fading out the first screen and fading in a second screen with respect to the selected object.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
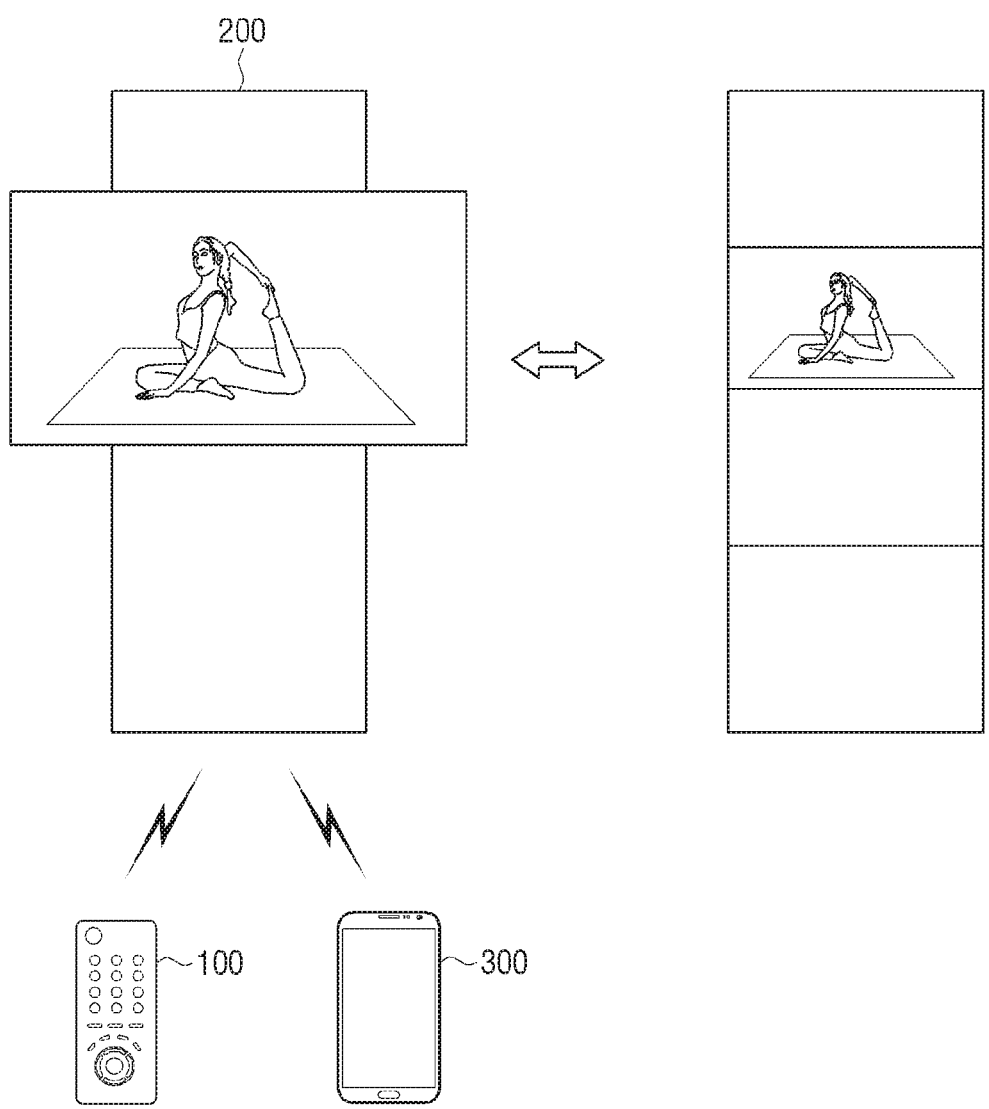
FIG. 1 is a view provided to explain a display system according to an embodiment.

Hereinafter, embodiments will be described in detail with reference to the drawings. In the following description, known configurations may be omitted. In addition, the following embodiments may be modified into various other forms, and the scope of the technical spirit of the present disclosure is not limited to the following examples. Rather, these embodiments are provided so that the present disclosure will be more thorough and complete, and will fully convey the scope of the technical spirit of the present disclosure to those skilled in the art.

It is to be understood that the disclosure herein is not intended to limit the scope to the described embodiments, but includes various modifications, equivalents, and/or alternatives of the embodiments. In the description of the drawings, like reference numerals refer to like elements throughout the description of drawings.

According to the present disclosure, the expressions "include," "comprise," "including," and "comprising" indicate that one or more components, steps, operations, and elements exist or are added, and do not exclude the presence of additional features.

In the present disclosure, the expressions "A or B," "at least one of A and/or B," or "one or more of A and/or B," and the like include all possible combinations of the listed items. For example, "A or B," "at least one of A and B," or "at least one of A or B" refers to (1) includes at least one A, (2) includes at least one B or (3) includes at least one A and at least one B.

Terms such as "first" and "second" may be used to modify various elements regardless of order and/or importance. Those terms are only used for the purpose of differentiating a component from other components.

When an element (e.g., a first constituent element) is referred to as being "operatively or communicatively coupled to" or "connected to" another element (e.g., a second constituent element), it should be understood that each constituent element is directly connected or indirectly connected via another constituent element (e.g., a third constituent element). However, when an element (e.g., a first constituent element) is referred to as being "directly coupled to" or "directly connected to" another element (e.g., a second constituent element), it should be understood that there is no other constituent element (e.g., a third constituent element) interposed therebetween.

The expression "configured to" as used in the present disclosure can refer to, for example, "suitable for," "having the capacity to," "designed to," "adapted to," "made to," or "capable of" depending on the situation. The term "configured to (or set to)" may not necessarily mean "specifically designed to" in hardware. Instead, in some circumstances, the expression "a device configured to" may mean that the device "is able to~" with other devices or components. For example, "a sub-processor configured to (or set to) execute A, B, and C" may be implemented as a processor dedicated to performing the operation (e.g., an embedded processor), or a generic-purpose processor (e.g., a central processor unit (CPU) or an application processor) that can perform the corresponding operations.

Hereinafter, the present disclosure will be described in detail with reference to the accompanying drawings.

Embodiments will be described in detail with reference to the accompanying drawings so that those skilled in the art can easily embody the present disclosure. The present disclosure may, however, be embodied in many different forms and should not be construed as limited to the embodiments set forth herein. In order to clearly illustrate the present disclosure, parts not related to the description are omitted, and like elements are denoted by like reference numerals throughout the specification.

FIG. 1 is a view provided to explain a display system according to an embodiment. Referring to FIG. 1, a display system according to an embodiment may include a display device 200, a remote control device 100 and a mobile device 300.

The display device 200 may be embodied as a digital television (TV) as shown in FIG. 1, but the present disclosure is not limited thereto. The display device 200 may be embodied as various types of display devices having a display function such as an audio, a speaker, a monitor, a projection TV, etc. which include a display. When the display device 200 is embodied as a digital TV, the display device 200 may be controlled by the remote control device 100. The remote control device 100 may be a device for remotely controlling the display device 200, and may receive a user interaction and transmit a control signal corresponding to an input user interaction to the display device 200. For example, the remote control device 100 may sense a motion of the remote control device 100 and transmit a signal corresponding thereto, recognize a voice and transmit a signal corresponding to the recognized voice, or transmit a signal corresponding to an input key.

The display device 200 may be operable in association with the mobile device 300. For example, the display device 200 may receive a specific content or a control command from the mobile device 300. The display device 200 may provide a mirroring function, which means simultaneously displaying the content displayed by the mobile device 300.

When a predetermined event occurs, as shown in FIG. 1, the display device 200 may rotate a rectangular-shaped display whose horizontal length is greater than a vertical length (hereinafter, referred to as "a horizontally oriented display") to be rectangular-shaped display whose vertical length is greater than a horizontal length (hereinafter, referred to as "a vertically oriented display"). In the similar manner, a display may be rotated so that a rectangular display whose vertical length is greater than a horizontal length is to be a display whose horizontal length is greater than a vertical length. When a predetermined event occurs while a screen including a plurality of objects is displayed on a vertically oriented display, the display device 200 may rotate a display to be disposed in a horizontal direction through a rotation controller, and rotate constituent elements included in a plurality of objects in a reverse direction while the display is rotated, thereby providing an effect of fixing a user's gaze with respect to constituent elements separately from a plurality of objects.

Figure 2:
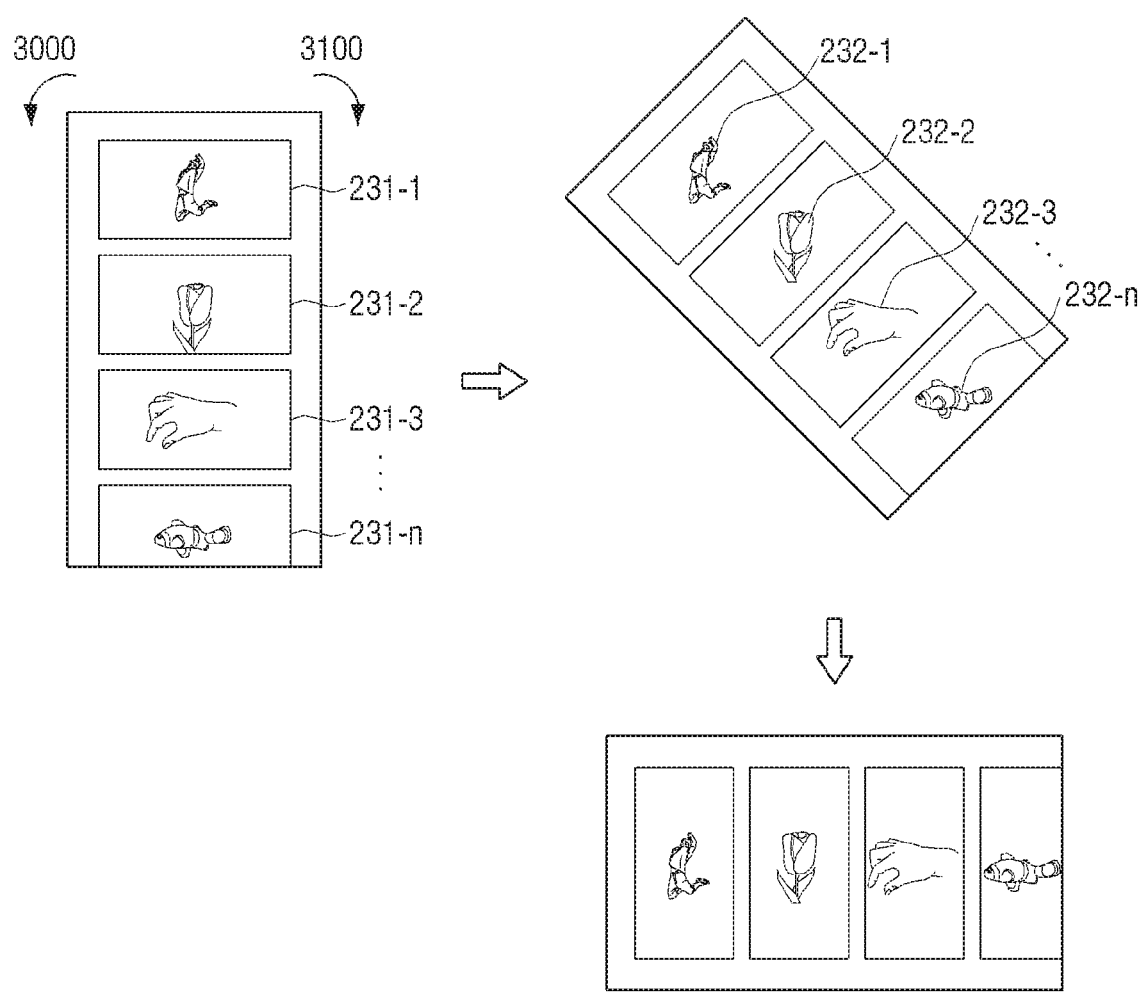
FIG. 2 is a view illustrating that a vertically-oriented display is rotated in a horizontal direction according to an embodiment.

FIG. 2 is a view illustrating that a vertically-oriented display is rotated in a horizontal direction according to an embodiment.

Referring to FIG. 2, the display device 200 may display a plurality of objects 231-1, 231-2, 231-3, and 231-n on the display 230 in a predetermined arrangement. When a predetermined event occurs, the display device 200 may rotate the display 230 in a first direction 3000 by a predetermined angle. As the display 230 rotates in the first direction, the display device 200 may rotate first constituent elements 232-1, 232-2, 232-3, . . . , and 232-n included in a plurality of objects in a direction different from the first direction while maintaining the arrangement of the plurality of objects 231-1, 231-2, 231-3, . . . , and 231-n. The direction different from the first direction 3000 may be a second direction 3100 which is a reverse direction to the first direction 3000.

The predetermined angle may be 90 degrees, but the present disclosure is not limited thereto. FIG. 2 illustrates that the display device 200 may rotate the display 230 in the first direction 3000 by 90 degrees, and rotate the first constituent elements 232-1, 232-2, 232-3, . . . , 232-n included in a plurality of objects in the second direction 3100 which is a reverse direction to the first direction while maintaining the arrangement of the plurality of objects 231-1, 231-2, 231-3, . . . , 231-n.

The first constituent elements 232-1, 232-2, 232-3, . . . , 232-n corresponding to the plurality of objects 231-1, 231-2, 231-3, . . . , 231-n may be rotated in the second direction 3100 at the same speed at which the display 230 rotates in the first direction 3000. That is, as the first constituent elements 232-1, 232-2, 232-3, . . . , 232-n and the display 230 rotate in opposite directions at the same speed. Thus, as viewed from a user, the first constituent elements 232-1, 232-2, . . . , 232-*n* may be kept fixed without being rotated. In this case, the arrangement of the plurality of objects 231-1, 231-2, 231-3, . . . , 231-*n* on the display 230 may be maintained and rotated.

Figure 3:
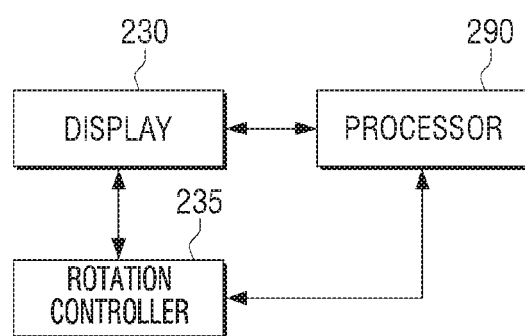
FIG. 3 is a block diagram illustrating configuration of a display device according to an embodiment.

FIG. 3 is a block diagram to explain configuration of a display device according to an embodiment. Various embodiments will be described with reference to a block diagram illustrating detailed configuration of the display device 200 of FIG. 3.

Referring to FIG. 3, a display device 200 may include a display 230, a rotation controller 235 and a processor 290.

The display 230 may output externally received or pre-stored image data or user interface (UI) under the control of the processor 190 or UI. The display 230 may be disposed in a horizontal direction or in a vertical direction under the control of the processor 290.

When a predetermined event occurs while the display 230 is disposed in a vertical direction, the display 230 may be rotated by the rotation controller 235 and disposed in a horizontal direction. When the display 230 in a vertical direction is rotated in a first direction while displaying a plurality of objects, the display 230 may rotate and display constituent elements included in a plurality of objects on a display screen in a second direction, which is a reverse direction to the first direction, and accordingly, display the constituent elements in a plurality of objects in a fixed direction separately from a plurality of objects even when the display is rotated.

The rotation controller 235 may rotate the display 230 under the control of the processor 290. According to an embodiment, the rotation controller 235 may include a motor configured to control rotation of the display 230. When a predetermined event occurs, the rotation controller 235 may rotate the display 230 in the vertical direction by 90 degrees so that the display 230 in the vertical direction is to be disposed in the horizontal direction.

The processor 290 may control the overall operation of the display device 200. When a predetermined event occurs while the display 230 displays a first image, the processor 290 may control the rotation controller 235 to rotate the display 230 by a predetermined angle. The predetermined event may be an event where a user directly inputs a user interaction, or an event where the display device 200 senses a predetermined condition without a user input. Examples of a user directly inputting a user interaction may include an event where a predetermined user interaction is detected in a predetermined area of a remote controller, an event where a predetermined user motion is photographed by a camera, an event where a predetermined user voice is input by a microphone, an event where a predetermined user touch is input to a touch detector provided on a bezel of the display 230, and the like. Examples of the event where the display device 200 detects a predetermined condition without a user input may include an event where contents in a specific condition is displayed on the mobile device 300 when a mirroring function is performed, an event where a specific game is executed, an event where a user motion is detected when a specific mode (e.g., a sleep mode) is operated, and an event where an external device (e.g., an electronic piano, etc.) is connected.

The processor 290 may control the rotation controller 235 and the display 230 to display constituent elements included in a plurality of objects by rotating in the second direction while maintaining the arrangement of the objects displayed on the display 230 when rotating the display 230 in the first direction. The processor 290 may fade out or fade in a part of the constituent elements included in the plurality of objects by rotating the display 230. The processor 290 may control the rotation controller 235 and the display 230 so that one of the plurality of objects may be highlighted.

The processor 290 may rotate the display 230 so that a part of the first screen before rotating may be faded out and a second screen including a new area may be displayed. The processor 290 may reduce the size of the object by rotating the display 230 and display the object of a reduced-size on the rotated display.

When changing the object displayed on the display 230 and rotating the display 230, the processor 290 may control the rotation controller 235 and the display 230 so that the object before changing may be faded out and the object after changing may be faded in.

The processor 290 may automatically rotate the display 230 as a content is changed, and control the rotation controller 235 and the display 230 to allow the display to automatically rotate according to a predefined rule in one content. When reproducing a music related content, the processor 290 may control the rotation controller 235 and the display 230 so that the display 230 automatically may rotate as the music related content is changed to an image content in the case where the reproduced object is a lyric related content. The processor 290 may control the rotation controller 235 and the display 230 so that a display automatically rotates according to rules of the content, such as an hourglass that flips when a certain amount of sand falls off.

When the reproduced object is a music related content, the processor 290 may control a speaker 240 to output a music track related to the content. The processor 290 may control the display 230 to display at least one of an album cover, artist photographs, lyrics, image contents (e.g., a music video, a teaser image, etc.) associated with the music related content.

When outputting a music track with reproducing the music-related content, the processor 290 may further control the display 230 to display pictures or images in order of relevance to the music track. The processor 290 may also control the display 230 to select and display a lyric design that matches the mood of the music track.

The processor 290 may reproduce a music video while displaying the music related content (e.g., lyrics, album cover, etc.) and outputting the music track. In this case, the processor 290 may control the display 230 and the rotation controller 235 so that an image content is reproduce and displayed by rotating a display. The processor 290 may control the speaker 240 to reproduce an image content music source having a waveform similar to that of the music content music source to synchronize the music content sound source with the image content sound source.

The processor 290 may change a mode of the display device 200 to a sleep mode when a user command is not input for a predetermined period of time. In order for the display device 200 to enter a sleep mode, the processor 290 may control the rotation controller 235 to allow the display 230 to be disposed in a vertical direction. The processor 290 may control the rotation controller 235 so that the display 230 is disposed in a vertical direction even when a power off command is received.

Figure 4:
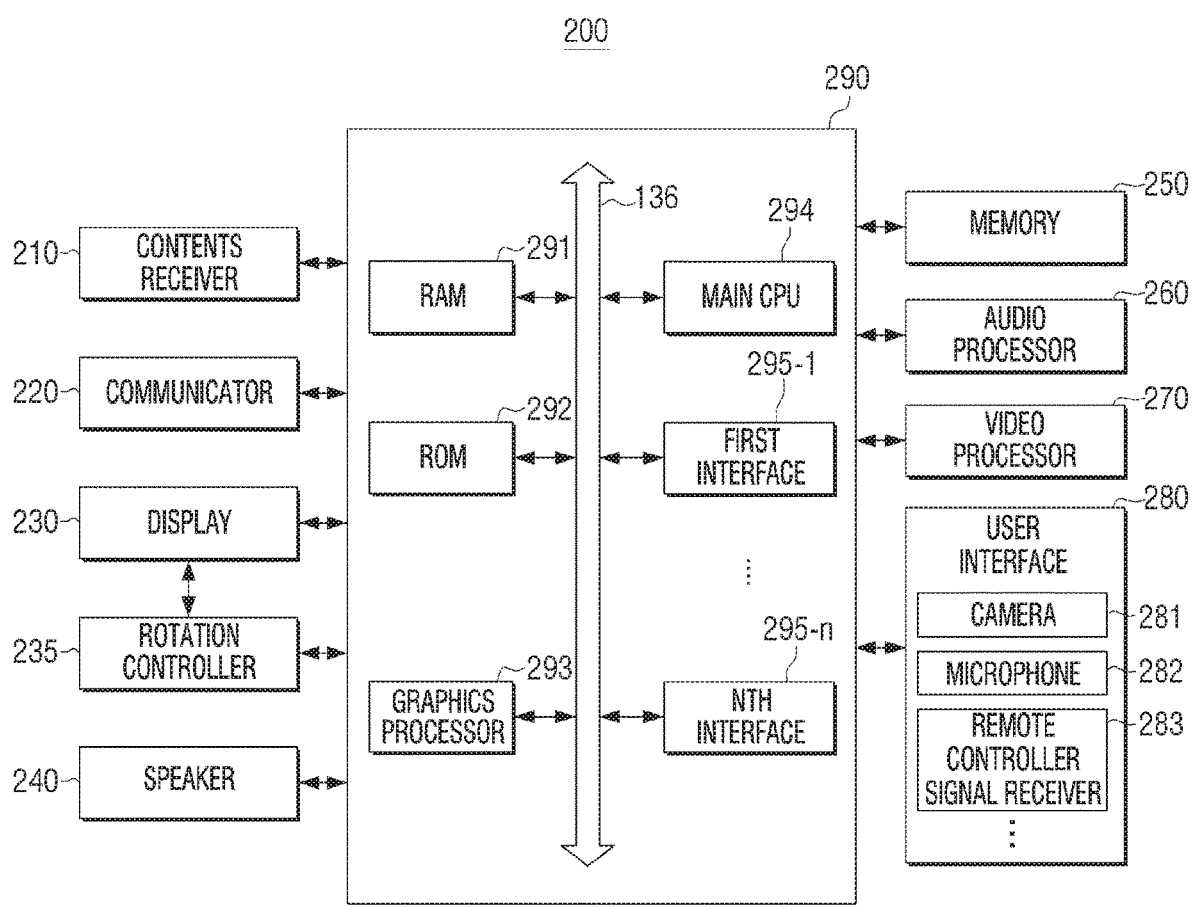
FIG. 4 is a detailed block diagram illustrating configuration of a display device according to another embodiment.

FIG. 4 is a detailed block diagram illustrating configuration of a display device according to another embodiment. Referring to FIG. 4, a display device 200 according to an embodiment may include a contents receiver 210, a communicator 220, a display 230, a rotation controller 235, a speaker 240, a memory 250, an audio processor 260, a video processor 270, a user interface 280 and a processor 290.

The contents receiver 210 may receive contents data through various sources. For example, the contents receiver 210 may receive content data from an external server or external devices (e.g., an electronic piano, an electronic Musical Instrument Digital Interface (MIDI), a digital versatile disc (DVD) player, a Universal Serial Bus (USB), etc.), etc., or content data stored in the memory 250. The contents receiver 210 may include a plurality of content receiving modules for displaying a plurality of objects on one display screen. For example, the contents receiver 210 may include a plurality of tuners for simultaneously displaying a plurality of objects.

The communicator 220 may be a transceiver (transmitter and receiver) configured to perform communication with various types of external devices or external servers according to various types of communication methods. The communicator 220 may include various communication chips such as a Wi-Fi chip, a Bluetooth chip, a near-field communication (NFC) chip, and a wireless communication chip. The Wi-Fi chip, the Bluetooth chip, and the NFC chip may communicate with each other using a Wi-Fi method, a Bluetooth method, and an NFC method. The NFC chip may refer to a chip operating in an NFC system using a band of 13.56 MHz among various radio-frequency identification (RFID) frequency bands such as 135 kHz, 13.56 MHz, 433 MHz, 860 to 960 MHz and 2.45 GHz. When a Wi-Fi chip or a Bluetooth chip is used, various connection information such as a service set identifier (SSID) and a session key may be transmitted and received first, and communication information may be used to transmit and receive various information.

The wireless communication chip may refer to a chip that performs communication according to various communication standards such as IEEE, ZigBee, 3rd Generation (3G), 3rd Generation Partnership Project (3GPP), Long Term Evolution (LTE), etc. When content data is received from an external server through the communicator 220, the communicator 220 may be implemented as the contents receiver 210.

The display 230 may display at least one of a video frame where contents data the contents receiver 210 receives is processed by a video processor 270 and various screens generated by a graphics processor 293. The display 230 may be rotated by the rotation controller 235. Specifically, the display 230 in the vertical direction may be rotated 90 degrees by the rotation controller 235 and positioned in the horizontal direction. In addition, when the display 230 in the vertical direction is rotated in the first direction while displaying a plurality of objects, the display 230 in the vertical direction may rotate and display an object included in the plurality of objects in the second direction, which is a reverse direction to the first direction.

The display 230 may include a liquid crystal display (LCD) panel, an organic light emitting diode (OLED) display panel, or the like, but the present disclosure is not limited thereto. In addition, the display 230 may be embodied with a flexible display, a transparent display, or the like.

According to an embodiment, the display 230 may include not also a display panel outputting an image but also a bezel housing a display panel. The bezel according to an embodiment may include a touch detector for detecting a user interaction.

The rotation controller 235 may rotate the display 230 under the control of the processor 290. When a predetermined event occurs, the rotation controller 235 may rotate the display 230 in the vertical direction by 90 degrees to be disposed in the horizontal direction.

The rotation controller 235 may rotate the display 230 according to a direction of a user interaction. For example, when a clockwise user interaction is input, the rotation controller 235 may rotate the display 230 in a clockwise direction.

According to an embodiment, the rotation controller 235 may rotate the display 230 by using a motor, but the present disclosure is not limited thereto. The rotation controller 235 may rotate the display 230 by using another constituent element (e.g., a chain, etc.).

The speaker 240 may output various alarming sounds and voice messages in addition to various audio data processed by the audio processor 260. When the content displayed on the display 230 is a music-related content, the speaker 240 may output a music track of the reproducing content.

The memory 250 may store various modules for driving the display device 200.

The audio processor 260 may be a constituent element for processing audio data. Various processing such as decoding, amplification, noise filtering, etc., with respect to audio data may be performed by the audio processor 260. The audio processor 260 may include a plurality of audio processing modules for processing audio data corresponding to a plurality of contents.

The video processor 270 may be a constituent element for processing contents data received from the contents receiver 210. The video processor 270 may perform various image processing such as decoding, scaling, noise filtering, frame rate conversion, resolution conversion, etc. The video processor 270 may include a plurality of video processing modules for processing video data corresponding to a plurality of contents.

The video processor 270 may process an image so that the size of the previously displayed image may be reduced in a horizontal direction during the rotation of the display 230.

The user interface 280 may detect a user interaction for controlling the overall operation of the display device 200. Referring to FIG. 4, the user interface 280 may include various interaction detection devices such as a camera 281, a microphone 282, a remote control signal receiver 283, etc.

The camera 281 may detect a motion of a user controlling the display device 200. The camera 281 may detect various user motions for controlling the display device 200. The microphone 282 may receive user voices or other sounds and change the user voices or other sounds into audio data.

The processor 290 may receive a user voice command input through the microphone 282, change the user voice command into audio data and store it in the memory 250. When the camera 281 and the microphone 282 are provided, the processor 290 may perform a control operation according to a user voice input through the microphone 282 or a user motion recognized by the camera 281. In other words, the display device 200 may operate in a motion control mode or in a voice control mode. When the display device 200 is operated in a motion control mode, the processor 290 may activate the camera 221 and detect a user, trace a motion change of the user and perform a control operation corresponding thereto. When the display device 200 is operated in a voice control mode, the processor 290 may analyze a user voice input through the microphone, and the display device may operate in a voice recognition mode for performing a control operation according to the analyzed user voice. In addition, a remote control signal receiver 283 may receive a remote controller signal including a control command from a remote controller as a remote control device 100. The remote control device 100 may be an external remote control device. The user interface 280 may receive a user interaction for rotating the display 230.

The processor 290 may control the overall operation of the display device 200 by using various programs stored in the memory 250.

Referring to FIG. 4, the processor 290 may include a random-access memory (RAM) 291, a read-only memory (ROM) 292, a graphics processor 293, a main CPU 294, first to n interfaces 295-1 to 295-n, and a bus 136. The RAM 291, the ROM 292, the graphics processor 293, the main CPU 294, the first to n interfaces 295-1 to 295-n, etc. may be connected to one another via the bus 136.

The ROM 292 may store a set of one or more instructions, etc. for system booting. When a turn-on command is input and power is supplied, the main CPU 294 may copy the operating system (O/S) stored in a memory 2100 to the RAM 291 according to the one or more instructions stored in the ROM 292, execute the O/S and perform system booting. When the booting is completed, the main CPU 294 may copy various application programs stored in the memory 2100 to the RAM 291, execute the application program copied to the RAM 291, and perform various operations.

The graphics processor 293 may generate a screen including various objects such as icons, images, texts, etc. using a calculator (not shown) and a renderer (not shown). The calculator may calculate attribute values such as a coordinate value, a shape, a size, a color, and the like to display each object according to the layout of the screen using the control command received from the user interface 280. The renderer may generate screens of various layouts including the objects based on the attribute values calculated by the calculator. The screen generated by the renderer may be displayed in the display area of the display 230.

The main CPU 294 may access the memory 250 and perform booting by using the O/S stored in the memory 250. The main CPU 294 may perform various operations using various program, contents, data, etc. stored in the memory 250.

The first to nth interfaces 295-1 to 295-n may be connected to various constituent elements described above. One of the interfaces may be a network interface connected to an external device via a network.

The processor 290 may display a plurality of objects on the display 230. When a predetermined event occurs, the processor 290 may rotate the display 230 in the first direction by a predetermined angle through the rotation controller 235. As the display 230 rotates in the first direction, the processor 290 may control the display 230 so that the constituent elements included in the plurality of objects are rotated in the second direction, which is a reverse direction to the first direction while maintaining the arrangement of the plurality of objects.

Hereinafter, various example embodiments will be described with reference to FIGS. 5 to 17.

Figure 5:
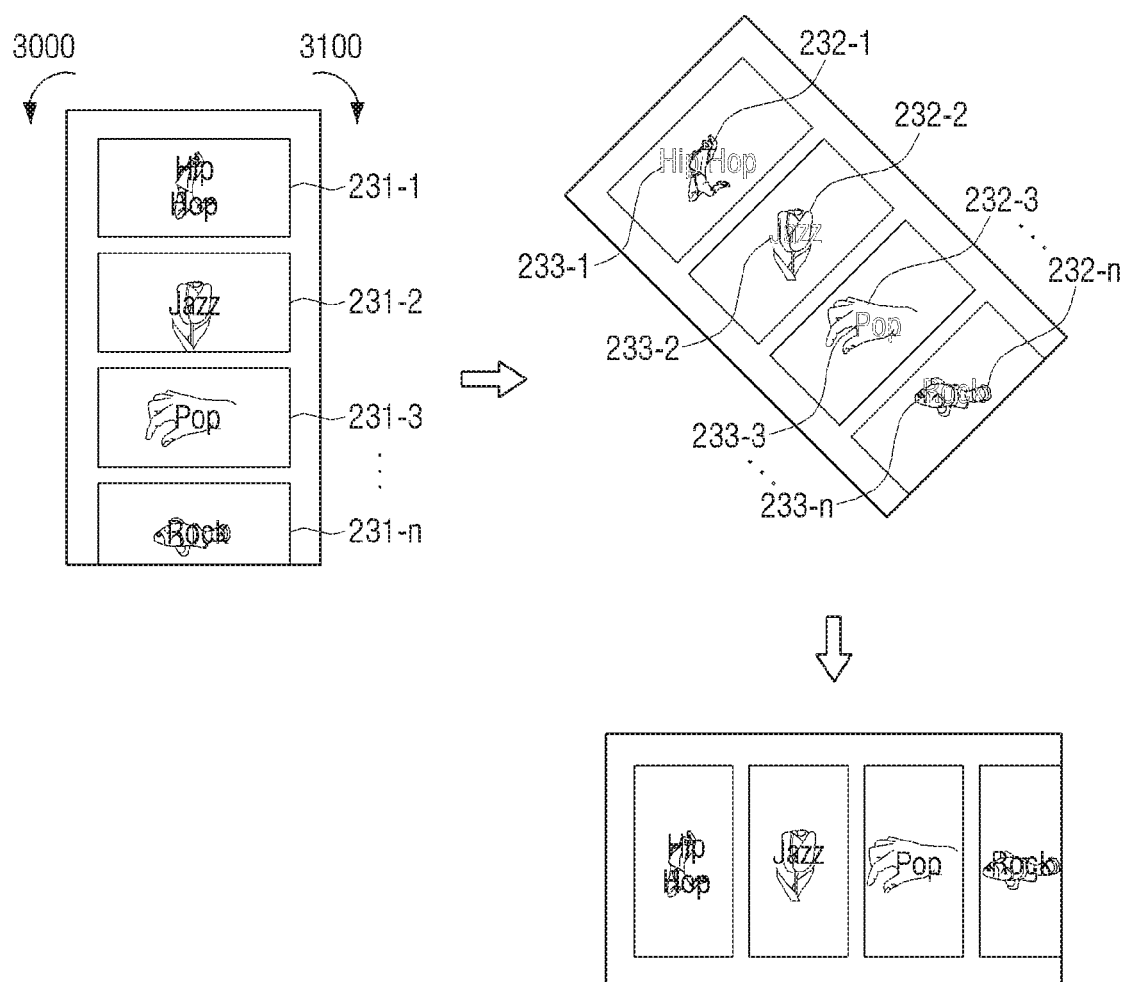
FIG. 5 is a view provided to explain a method for displaying contents where a plurality of constituent elements in a plurality of objects are processed and rotated in different manners according to an embodiment.
Figure 6:
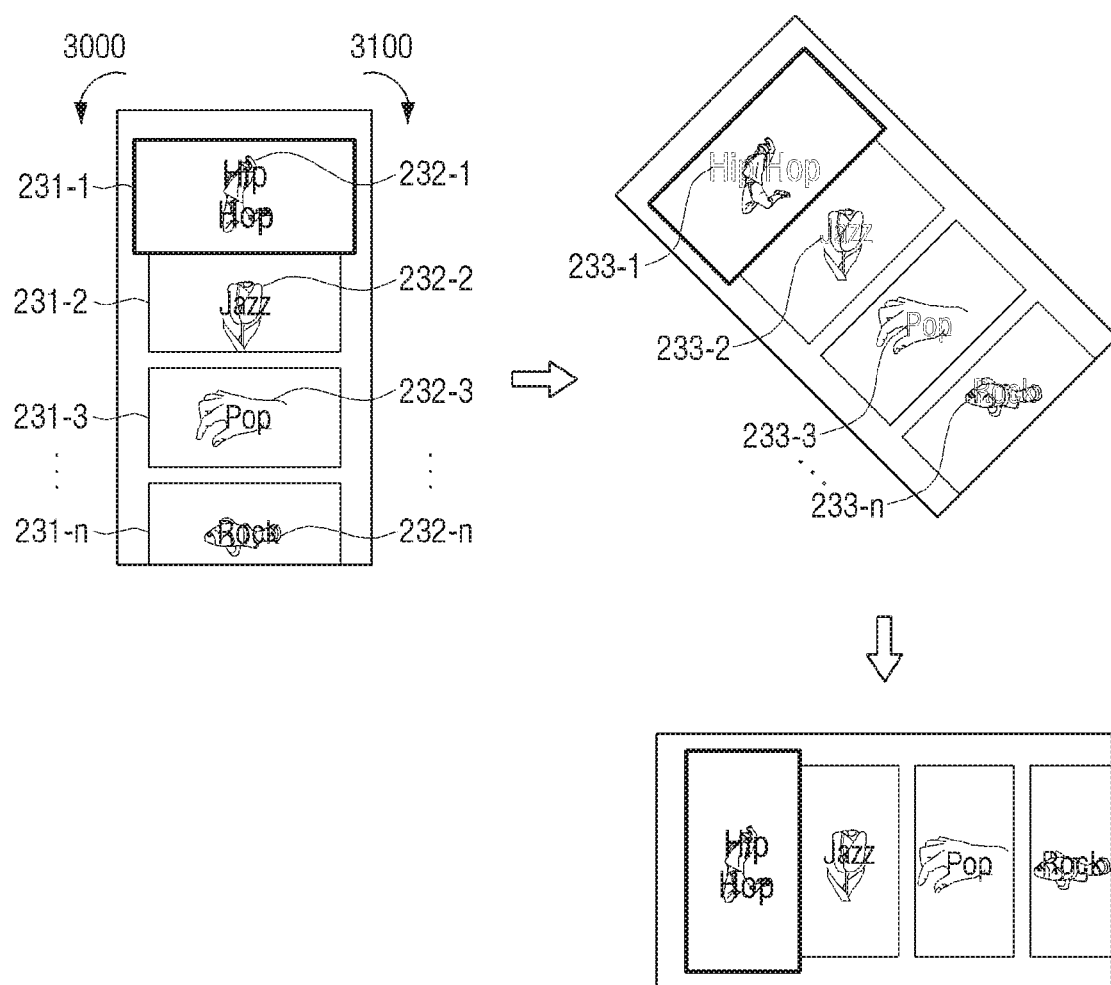
FIG. 6 is a view provided to explain a method for displaying contents where a specific object among a plurality of objects is processed and rotated in a different manner according to an embodiment.

According to an embodiment, FIGS. 5 and 6 illustrate that the display device 200 processes and displays a plurality of constituent elements respectively included in a specific object or in a plurality of objects in different manners when a plurality of objects are rotated.

A first constituent element included in a plurality of objects may be a thumbnail image displaying a content included in each object. A second constituent element included in a plurality of objects may be a text with respect to a content included in each object. For example, FIG. 5 is a view provided to explain a method for displaying a content where a plurality of constituent elements are processed and rotated in a different manner.

In the similar manner as FIG. 2, FIG. 5 illustrates the arrangement of a plurality of objects 231-1, 231-2, 231-3, and 231-n on the display 230. The plurality of objects 231-1, 231-2, 231-3, and 231-n may include the first constituent elements 232-1, 232-2, 232-3 and 232-n and the second constituent elements 233-1, 233-2, 233-3 and 233-n. As described above, each of the first constituent elements 232-1, 232-2, 232-3 and 232-n may be a thumbnail image with respect to a content included in each of the plurality of objects 231-1, 231-2, 231-3, and 231-n. In the similar manner, each of the second constituent elements 233-1, 233-2, 233-3 and 233-n may be a text with respect to a content included in each of the plurality of objects 231-1, 231-2, 231-3, and 231-n.

In the similar manner as FIG. 2, referring to FIG. 5, when a predetermined event occurs, the display device 200 may rotate the display 230 in the first direction 3000 by a predetermined angle. As the display 230 rotates in the first direction, the display device 200 may rotate the first constituent elements 232-1, 232-2, and 232-n and the second constituent elements 233-1, 233-2, and 233-n included in the plurality of objects in the second direction 3100, which is a reverse direction to the first direction 3000, while maintaining the arrangement of the plurality of objects 231-1, 231-2, 231-3, and 231-n.

The display 230 may display the second constituent elements 233-1, 233-2, 233-3, and 233-n by fading out and fading in, unlike the first constituent elements 232-1, 232-2, 233-3, and 232-n which simple rotate. Referring to FIG. 5, the display 230 may fade out the second constituent elements 233-1, 233-2, 233-3, and 233-n while the second constituent elements 233-1, 233-2, . . . , and 233-n are rotated by 0 degree to 45 degrees in the second direction 3100, and fade in the second constituent elements 233-1, 233-2, . . . , and 233-m while the second constituent elements 233-1, 233-2, . . . , and 233-n are rotated by 45 degrees to 90 degrees.

According to the above described embodiment, the second constituent elements 233-1, 233-2, 233-3 and 233-n may rotate by being faded out and in, but the display device 200 may process and rotate each constituent element in various methods. For example, the display device 200 may rotate the second constituent elements 233-1, 233-2, 233-3 and 233-n in a highlighted state, or rotate them by adjusting the size based on a predetermined rule, or rotate them so that the second constituent elements 233-1, 233-2, 233-3 and 233-n may additionally display the detailed explanation for the first constituent elements 232-1, 232-2, 232-3, and 232-n.

The display device 200 may process and rotate the first constituent elements 232-1, 232-2, 232-3 and 232-n in addition to the second constituent elements 233-1, 233-2, 233-3 and 233-n in various manners.

Through the above-described example, the display device 200 may provide a user with an effect of maintaining the overall sense of composition and focusing attention on a specific element, and provide various visual effects.

According to another example embodiment, FIG. 6 is a view provided to explain a method for displaying contents where a specific object among a plurality of objects is processed and rotated in a different manner from another object according to an embodiment.

Referring to FIG. 6, when a predetermined event occurs while at least one object 231-1 among a plurality of objects

231-1, 231-2, 231-3, and 231-*n* is highlighted, the display device 200 may rotate the display 230 in the first direction 3000 by a predetermined angle. As the display 230 rotates in the first direction, the display device 200 may maintain the arrangement of the specific object 231-1 and the other plurality of objects 231-2, 231-3, and 231-*n* and rotate the plurality of objects 231-1, 231-2, 231-3, and 231-*n* while maintaining the highlight of the specific object 231-1.

According to the above described embodiment, it is described that a specific object is highlighted and rotated, but the display device 200 may rotate an object by processing in various manners. For example, the display device 200 may rotate a specific object by adjusting the size thereof, or rotate a specific object by displaying a content related thereto.

Through the above-described example embodiments, the display device 200 may maintain the arrangement of objects without being out of user's focus on the specific object 231-1, thereby providing a viewing experience where an overall sense of composition is maintained.

As described in FIGS. 2 and 5, the first constituent elements 232-1, 232-2, 232-3 and 232-*n* and the second constituent elements 233-1, 233-2, 233-3 and 233-*n* included in the plurality of objects may be rotated in a direction different from the first direction. The direction different from the first direction 3000 may be the second direction 3100 which is a reverse direction to the first direction 3000. In the similar manner, the first constituent elements 232-1, 232-2, 232-3 and 232-*n* and the second constituent elements 233-1, 233-2, 233-3 and 233-*n* may rotate at the speed same the display 230 rotates.

Referring to FIGS. 7 to 11, various example embodiments for processing contents displayed on the display 230 related to the rotation of the display 230 will be described.

Figure 7:
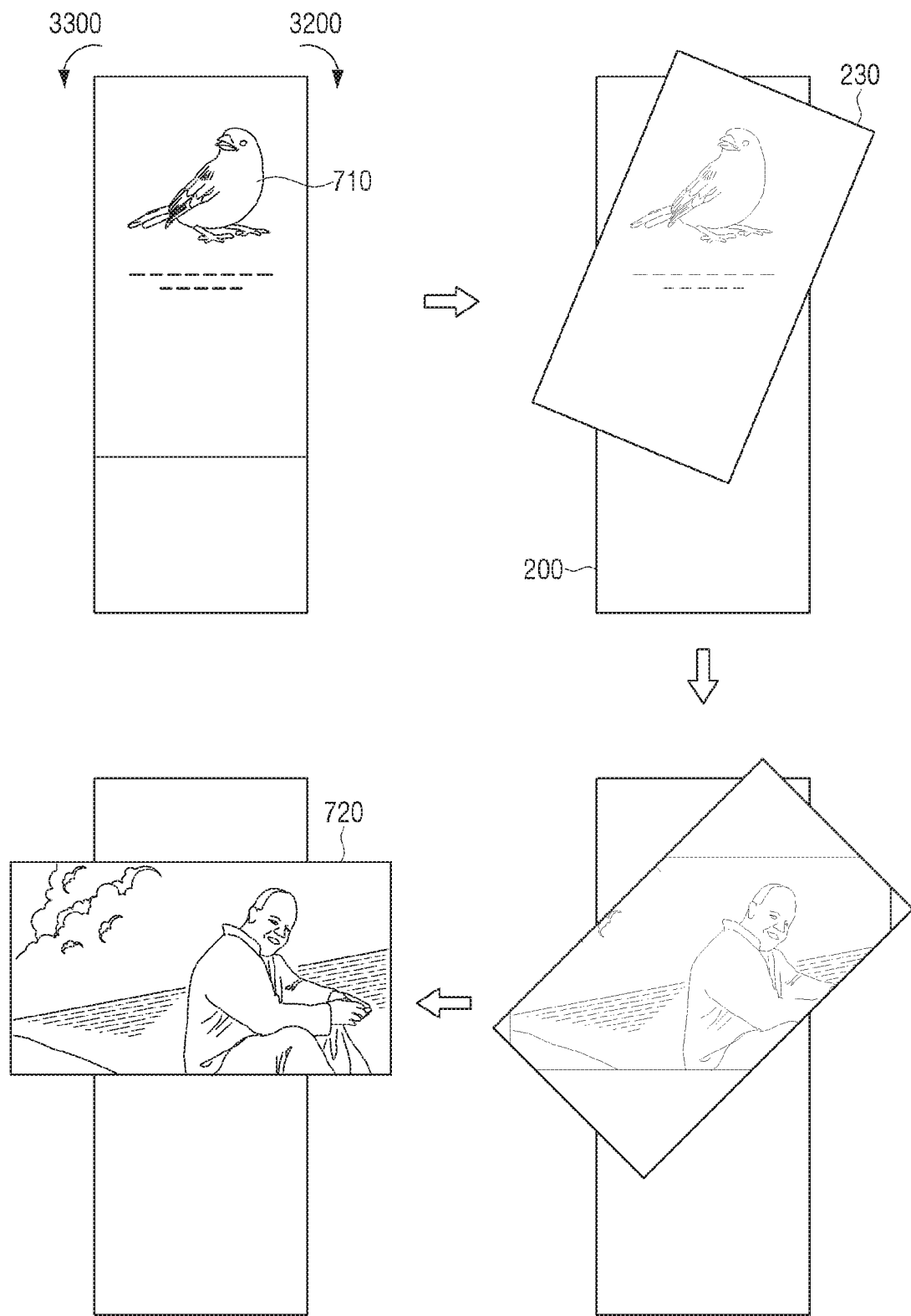
FIG. 7 is a view provided to explain a method for displaying contents of changing a displayed screen while rotating a display of a display device according to an embodiment.

FIG. 7 is a view provided to explain a method for displaying contents of changing a displaying screen while rotating a display of a display device according to an embodiment.

FIG. 7 illustrates a process where a first screen 710 is switched to a second screen 720 when the display device 200 rotates the display 230 in a vertical direction to be disposed in a horizontal direction. When one of a plurality of objects 231-1, 231-2, 231-3, and 231-*n* in FIGS. 2, 5 and 6 is selected, the display device 200 may display a first screen with respect to the selected object.

First contents displayed on the first screen may be second contents related to the contents displayed on the second screen. For example, the first contents on the first screen may be an album cover of music contents, and the second contents on the second screen may be image contents of the music contents (e.g., a music video).

The display device 200 may display the second contents related to the first contents when receiving a user input for displaying the second contents related to the first contents while displaying the first screen. The display device 200 may automatically rotate the display 230 when the second contents are optimized for a horizontally oriented display.

According to the settings, the display device 200 may automatically display the second content related to the first content when the first content is displayed when a specific first content is displayed. For example, if it is set that a movie is to be displayed when a user plays a movie Official Sound Track (OST) music track, the display device 200 may automatically display a movie content as the second content when the movie OST music source is selected as the first content. When the movie content is optimized for the horizontally oriented display, the display device 200 may automatically rotate the display 230.

As described in FIGS. 2, 5 and 6, the display device 200 may rotate the display 230 in the second direction 3100 by a predetermined angle through the rotation controller 235 when a predetermined event occurs while the first screen 710 in a vertical direction is displayed. The display device 200 may fade out the first screen with respect to the object, and fade in the second screen 720 with respect to the object as the display 230 is rotated. In the similar manner, the display device 200 may rotate the first screen 710 and the second screen 720 in the second direction 3300 which is a reverse direction to the first direction 3200 as the display 230 rotates in the first direction 3200. The display device 200 may equalize a speed at which the first screen and the second screen are rotated in the second direction 3300 and a speed at which the display 230 is rotated in the first direction 3200. In addition, as the display 230 is rotated in the first direction, the display device 200 may display the screens so that the first screen 710 may face out while rotating in the second direction, and the second screen may fade in rotating in the second direction. Accordingly, although the display 230 is rotated, the display device 200 may display the first screen 710 and the second screen 720 in a predetermined direction without rotating, thereby allowing a user to enjoy a viewing experience where a user's gaze is focused.

Figure 8:
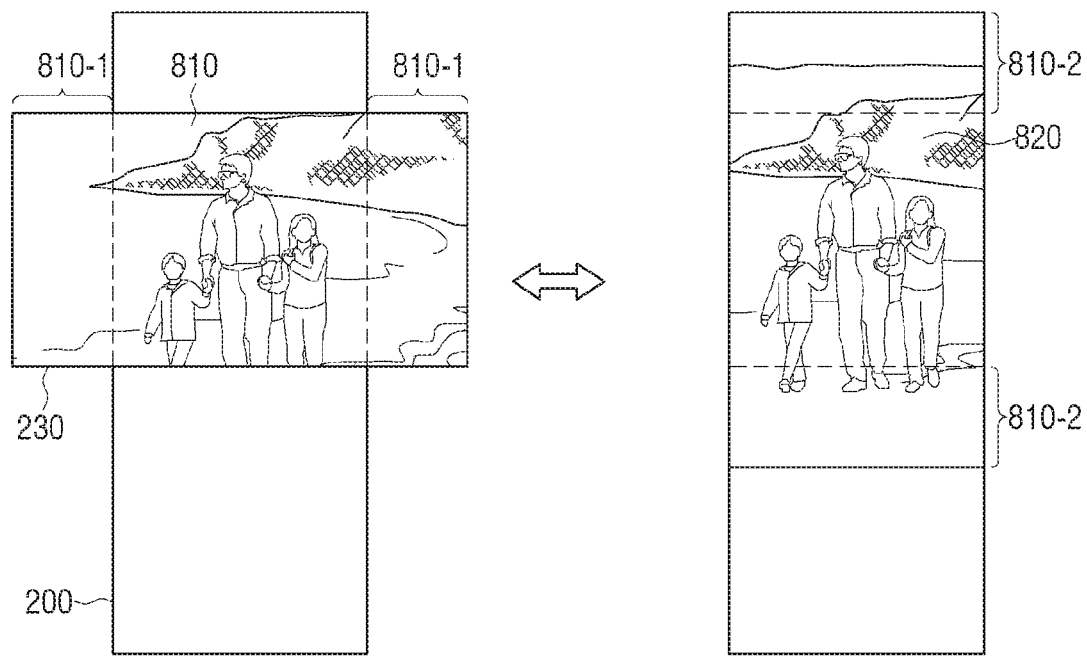
FIG. 8 is a view illustrating a method for displaying contents which are playable both in a horizontal direction and in a vertical direction of a display device according to an embodiment.

FIG. 8 is a view provided to explain a method for displaying contents which are playable both in a horizontal direction and in a vertical direction of a display device according to an embodiment.

As described above, when the display 230 is rotated in the first direction, the display device 200 may rotate the object displayed on the display 230 in the second direction which is a reverse direction to the first direction. Referring to FIG. 8, the display device 200 may display objects playable by both a horizontally oriented display and a vertically oriented display on the display 230. The display device 200 may remove a partial area 810-1 of a first screen 810 and display a second screen 820 including a new area 820-2 by rotating the display 230.

The display device 200 may remove the partial area 810-1 by fading out, and display the new area 820-2 by fading in. Accordingly, a user may naturally watch the removed area and the added area through the display device 200.

As described above, as the display 230 rotates in the first direction, the display device 200 may rotate the first screen 810 and the second screen 820 in the second direction, which is a reverse direction to the first direction, thereby providing a user with an experience where a user's gaze is focused.

Figure 9:
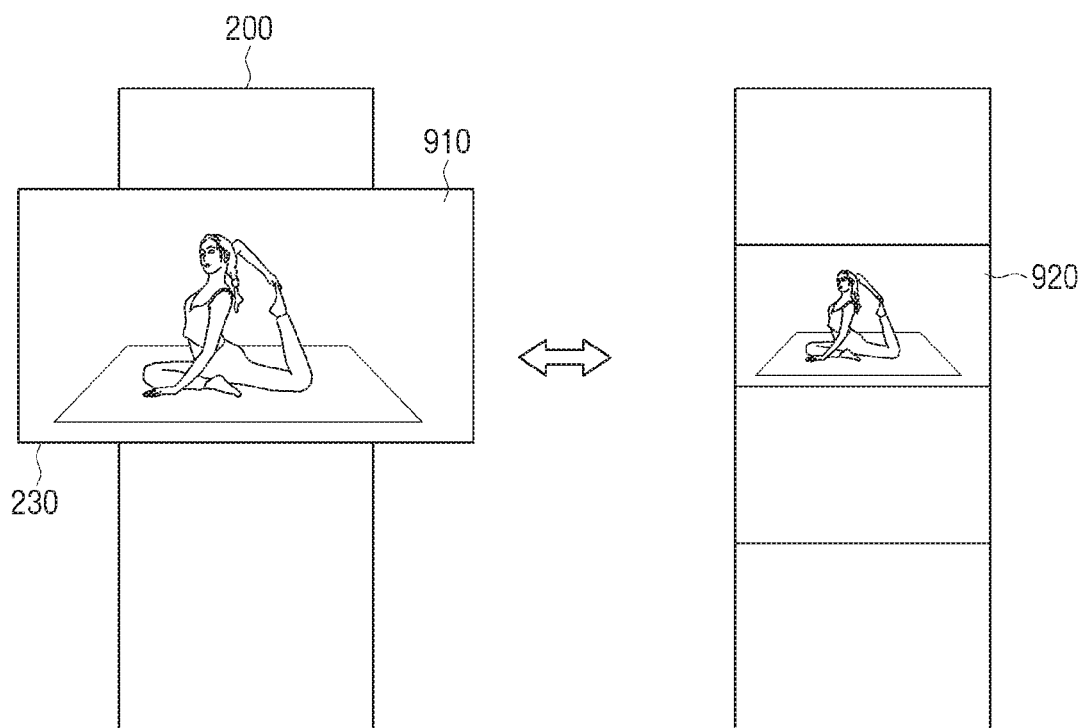
FIG. 9 is a view illustrating a method for displaying contents optimized for a specific format of a display device according to an embodiment.

FIG. 9 is a view illustrating a method for displaying contents optimized for a specific format of a display device according to an embodiment.

As described above, when the display 230 is rotated in the first direction, the display device 200 may rotate the object displayed on the display 230 in the second direction which is a reverse direction to the first direction. Referring to FIG. 9, the display device 200 may display an object optimized to be replayed in a specific format such as a horizontally oriented display or a vertically oriented display on the display 230. As the display is rotated, the display device 200 may reduce the size of the object on the first screen 910 and display the object of a reduced-size on the second screen 920 of the display 230.

Figure 10:
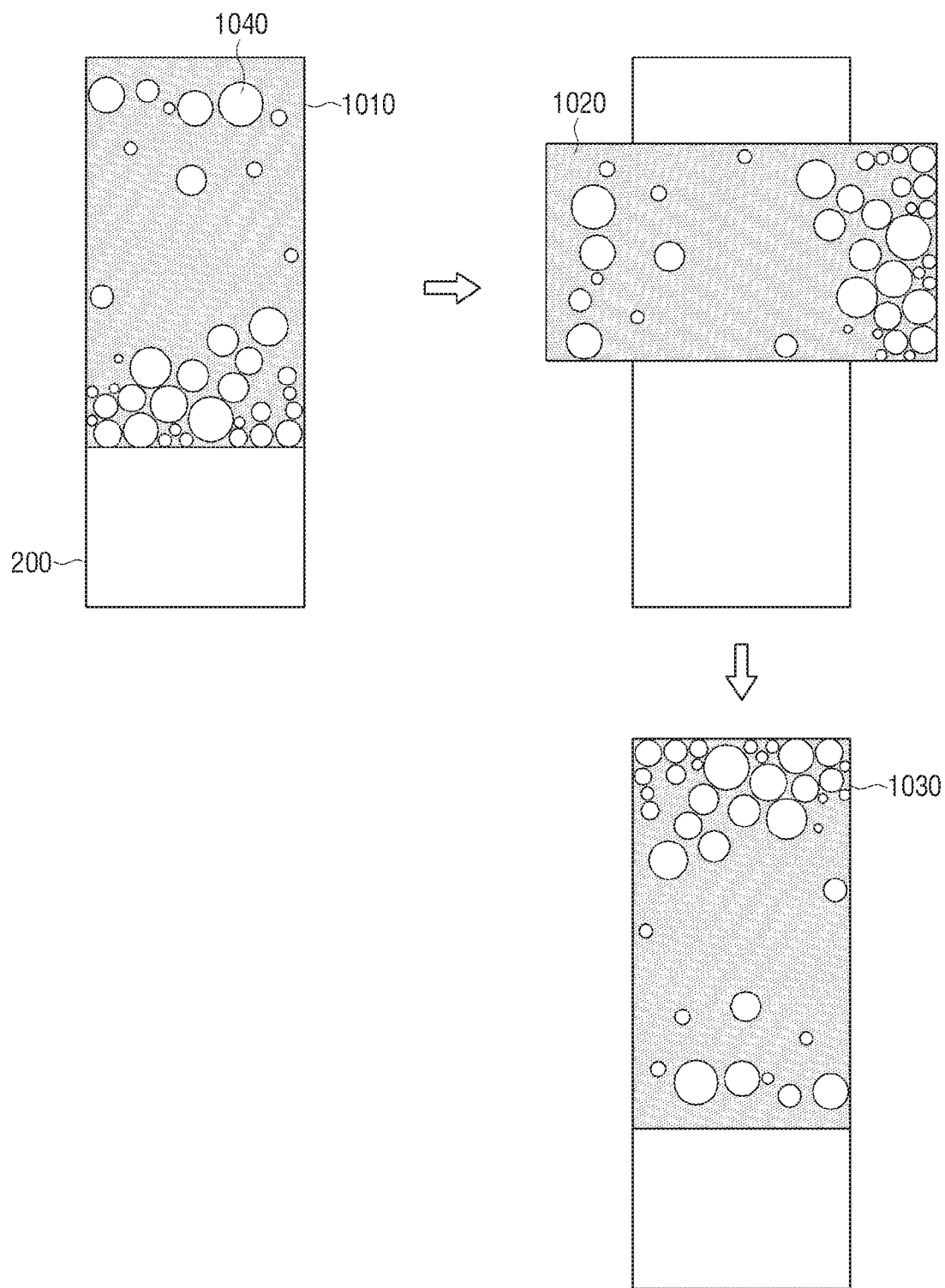
FIG. 10 is a view illustrating automatic rotation of a display based on content settings according to an embodiment.

As the display 230 is rotated in the first direction, the display device 200 may rotate the first screen 910 and the second screen 920 in the second direction, which is a reverse direction to the first direction, thereby providing a user with an experience where a user's gaze is focused FIG. 10 is a view illustrating automatic rotation of a display according to content settings according to an embodiment.

The display device 200 may display contents where a predetermined effect is reproduced on the display 230. Referring to FIG. 10, the display device 200 may display a content that reproduces an effect where a predetermined object 1040 moves from the top to the bottom of the display 230 and accumulates on the display 230 such as a first state 1010. When a predetermined condition is satisfied (e.g., in the case where 70% of the predetermined object 1040 is stacked on the bottom of the display), the display device 200 may rotate the display 230 in a predetermined direction, such as a second state 1020. However, the predetermined conditions set forth above are merely exemplary and may include various conditions. The display device 200 may then continue to rotate in a direction as the second state 1020 and rotate the display 230 so that a lower end of the display is to be an upper end, such as a third state 1030. Thereafter, the predetermined object 1040 may move from the top of the display to the bottom of the display, and the contents such as in the first state 1010 may be displayed on the display 230. In the similar manner, when the predetermined condition is satisfied in the first state 1010, the display device 200 may rotate the display 230.

In the above description, the display device 200 may automatically rotate the display 230, and the specific embodiment as shown in FIG. 10 has been described. However, the present disclosure is not limited thereto. That is, the display device 200 may automatically rotate the display 230 according to the optimized height to width ratio of the object to be reproduced on the display 230. For example, when the display 230 displays an object optimized for the vertically oriented display while displaying the object in the horizontal direction, the display device 200 may automatically rotate the display 230 in the vertical direction.

Figure 11:
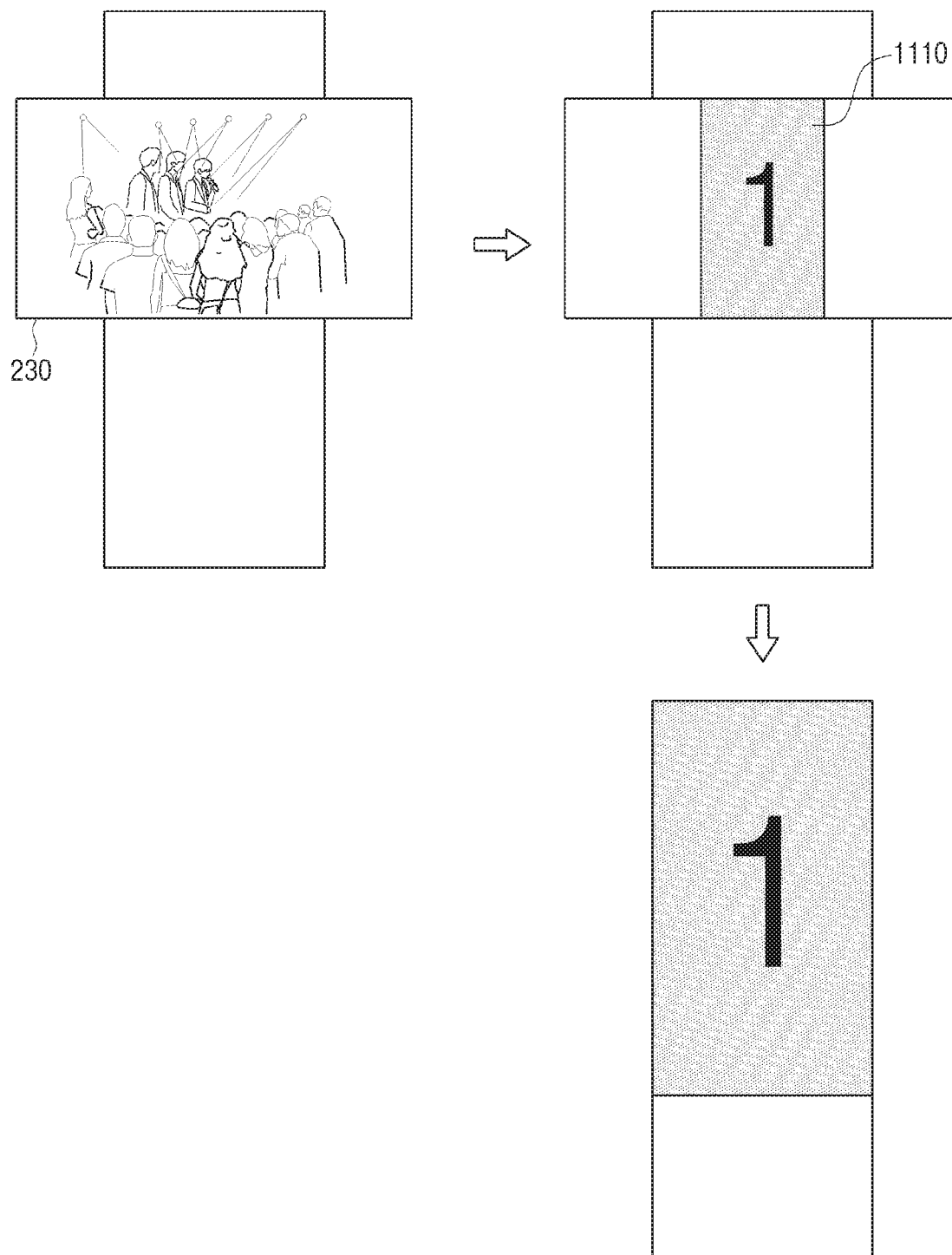
FIG. 11 is a view illustrating an example embodiment in which a display is not automatically rotated based on display device settings according to an embodiment.

However, the present disclosure is not limited thereto. As shown in FIG. 11, according to the settings, although an object 1110 optimized for a vertically oriented display is displayed, the display 230 may not be automatically rotated. In order to rotate the display 230, the display device 200 may be set for a user to manually input a rotation command. A user may input a rotation command through a touch detector included in a bezel housing the display 230, or input a rotation command though the camera 281 using a user motion. A rotation command may be input through the microphone 282 by user voice, and a rotation command may be input through the remote control device 100 and the mobile device 300. However, the present disclosure is not limited thereto, but a rotation command may be input in various types.

FIGS. 12 to 15 illustrate various example embodiments where a specific music related content is selected by a user from a plurality of objects on the display 230.

Figure 12:
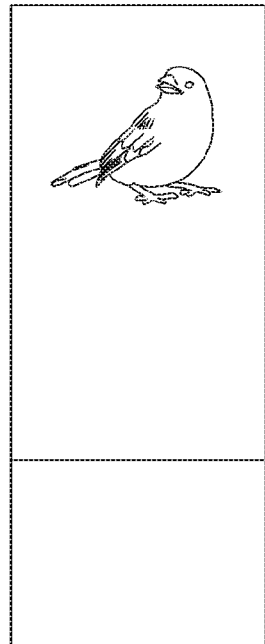
FIG. 12 is a view illustrating a case where an object displayed on a display is a music related content according to an embodiment.
Figure 12:
Figure 12:
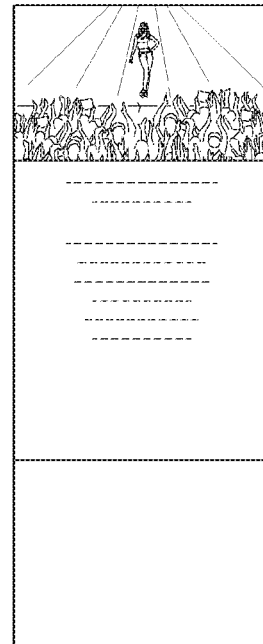
Figure 12:
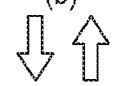
Figure 12:
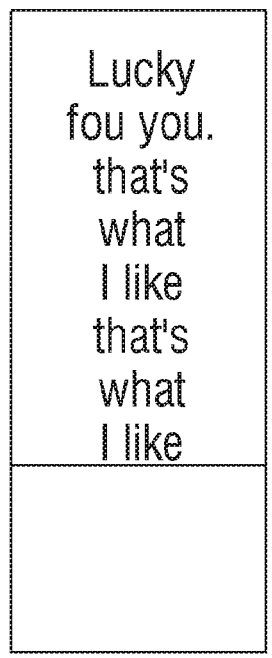
Figure 12:
Figure 12:
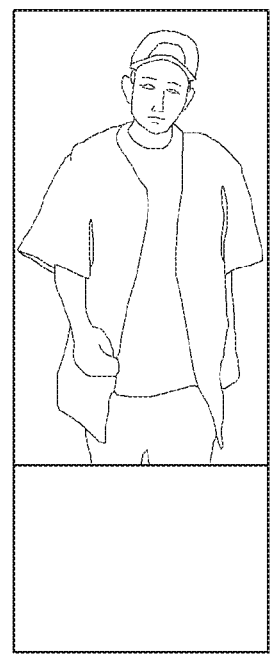

Referring to FIG. 12, when a content included in the selected object is a music related content, the display device 200 may display a screen including at least one of an album cover related to the music, pictures related to music track, artist pictures, lyrics, etc. The display device 200 may output a music track corresponding to a content through the speaker 240. A user may control the display device 200 to display a screen different from a displaying screen through a user interaction. For example, when the display device 200 receives a user interaction while displaying an album cover (step (a) of FIG. 12) on the display 230, the display device 200 may display lyrics together with the photo related to the music track. Similarly, when the user interaction is received while the display device 200 displays the content as shown in step (b) of FIG. 12, the artist picture may be displayed as shown in step (c) of FIG. 12. Step (d) of FIG. 12 shows an example in which the display device 200 displays the lyric content. The user interaction may be input through the mobile device 300 or the remote control device 100, may be a motion of the user sensed through the camera 281, or may be a user voice received through the microphone 282.

The display device 200 may display the display 230 so that one of the first screen and the second screen may include at least one of the album cover, artist pictures and lyrics related to the music-related content, and the other one of the first screen and the second screen may include an image content related to the music content (e.g., a music video, a teaser image, etc.). In this case, the first screen may be a screen displayed by a vertically oriented display and the second screen may be a screen display by a horizontally oriented display.

The display device 200 may display the music related content which is replayed by the mobile device 300 while being linked to the mobile device 300 of a user, or receive and display the music related content from the mobile device 300 through the contents receiver 210. The display device 200 may receive the music related content from an external server through the communicator 220 and display the content.

Figure 13:
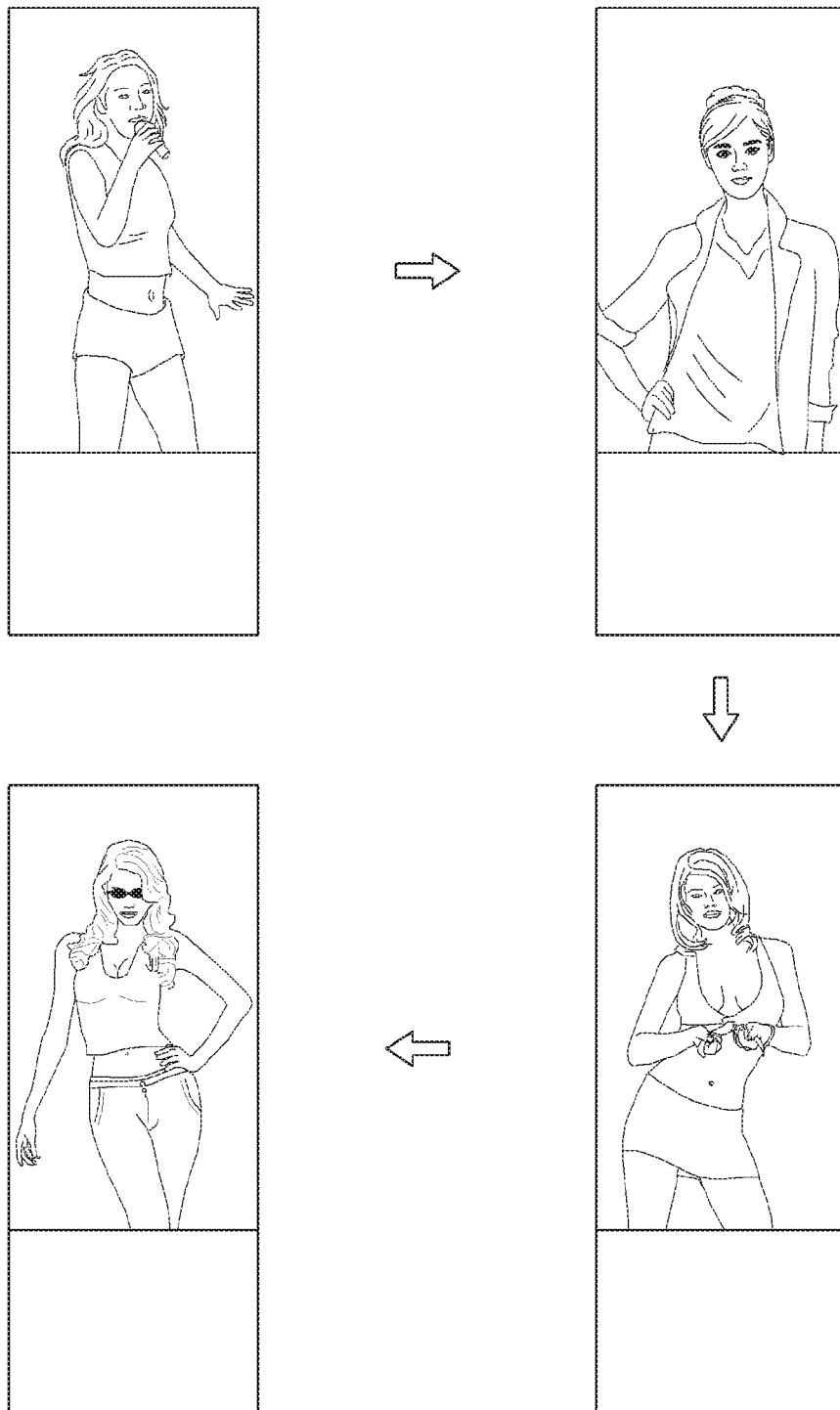
FIG. 13 is a view illustrating displaying of objects related to a music related content in order of priority according to an embodiment.

Referring to FIG. 13, the display device 200 may reproduce the content related to the music source on the display 230 according to the priority of the contents when outputting the music source corresponding to the music related content through the speaker 240. FIG. 13 illustrates that the display device 200 displays the contents (artist pictures in FIG. 13) according to the priority based on the relevance to the music source on the display 230, outputting the music source through the speaker 240.

Specifically, the display device 200 may analyze music track information such as artist information, music track information, music track announcement timing, and the like with respect to the reproduced music track. Accordingly, the display device 200 may set a priority based on the analyzed music track information. The display device 200 may prioritize the music track based on the resolution of the pictures, whether the information is an image or a video of the performance of the artist with respect to the music track, and whether the information is an image or a video of the artist who is about to release a music track. These prioritization criteria are merely exemplary and the information can be prioritized on a variety of criteria and sequences.

Figure 14:
FIG. 14 is a view illustrating a case where an object displayed by a display device is a music-related content and a lyric content related to music is displayed according to an embodiment.
Figure 14:
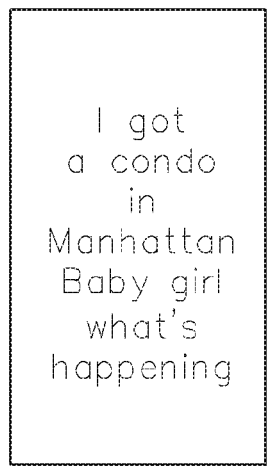
Figure 14:
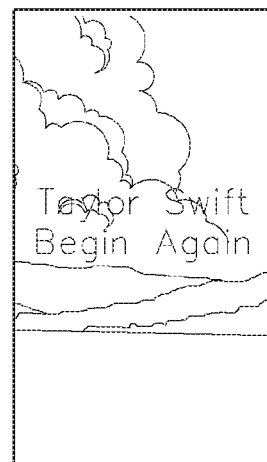

FIG. 14 is a view illustrating a case where an object displayed by a display device is a music-related content and a lyric content related to the music is displayed.

The display device 200 may analyze music track information such as music track genre, music track tempo, music track lyrics, and the like in association with a reproduced music track. Accordingly, the display device 200 may select and provide the lyric design suitable for the mood of the music track among the designs pre-stored in the memory 250, based on the analyzed music track information.

FIG. 14 illustrates an example of a lyric design provided when the genre of a music track is a dance in (a). FIG. 14 illustrates an example of a lyric design provided when the tempo of the music track is a groove in (b). FIG. 14 illustrates an example of a lyric design provided when the genre of the music track is a pop and the tempo of the music track is relaxing in (c). The lyric design provided by the display device 200 is not limited to the above-described example, and could be embodied as various forms. In addition, the display device 200 may update the additional lyric design through the communicator 220 or the contents receiver 210.

Figure 15:
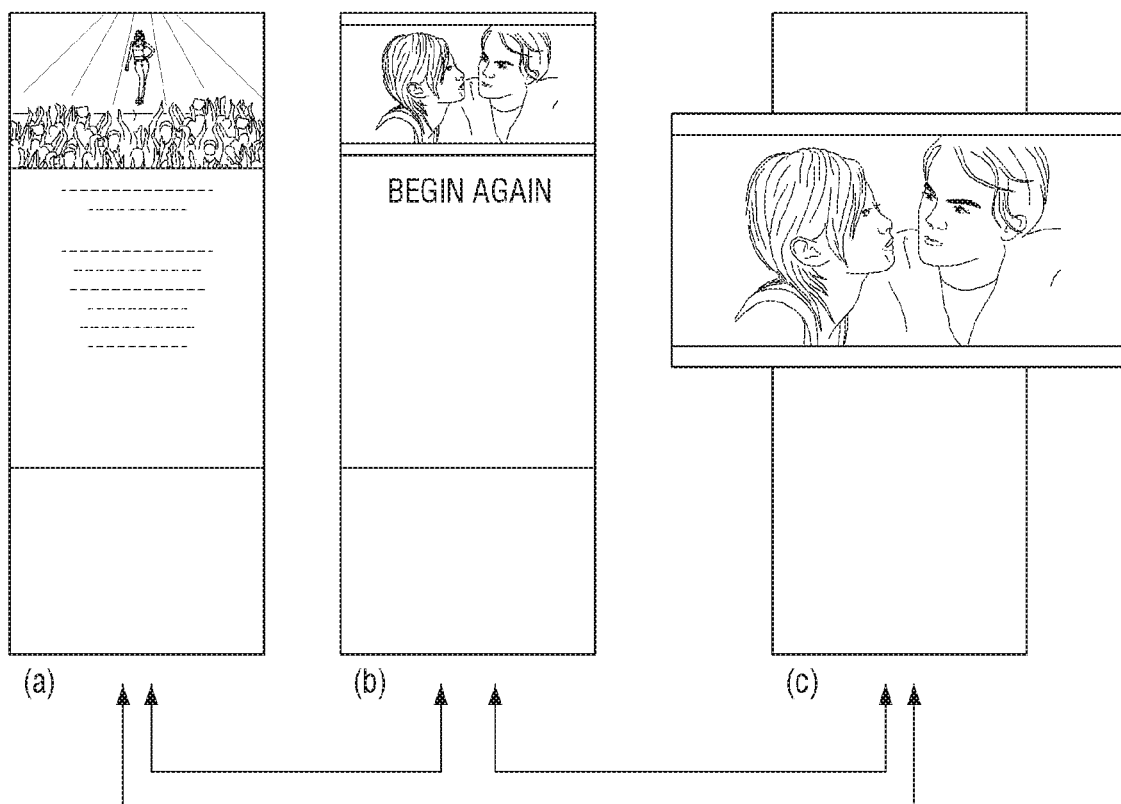
FIG. 15 is a view illustrating a case of changing a music content to an image content while playing a music track when an object displayed by a display device is a music related content according to an embodiment.

FIG. 15 is a view illustrating a case of changing a music content to an image content while playing a music track when an object displayed by a display device is a music related content.

Referring to FIG. 15, the display device 200 may reproduce a music track through the speaker 240 as shown in (a), and display the lyrics and the album cover associated with the music track on the display 230. In this case, when a user inputs a command to reproduce an image content related to the music track, the display device 200 may reproduce an image content related to the music track as shown in (b).

When an image content is optimized for a horizontally oriented display while a music source is reproduced as shown in FIG. 15, step (a), the display device 200 may provide the display 230 in a rotational direction as shown in FIG. 15, step (c), by automatically rotating the display 230. In this case, as shown in FIG. 7, the display device 200 may allow a user to have a focused gaze by rotating display 230 in a reverse direction to the rotational direction and provide contents by fading out and fading in.

However, although the image content is a content optimized for a horizontally oriented display, according to the settings, the display device 200 may not rotate the display 230 as shown in (b) of FIG. 15 and may provide an image content in a reduced size.

When the display device 200 provides a screen as shown in (b) of FIG. 15, and the display 230 is set to be manually rotated, a user may rotate the display 230 by manually inputting a rotation command as shown in (c) of FIG. 15.

A user may input a rotation command through a touch detector included in a bezel housing the display 230, or input a rotation command through the camera 281 using a user motion. A user may input a rotation command through the microphone 282 by user voice, or input a rotation command through the remote control device 100 and the mobile device 300. However, the present disclosure is not limited thereto, but a user may input a rotation command in various manners.

In this case, as described with reference to FIG. 7, a user may have a focused gaze by rotating the contents in a reverse direction to the rotation direction of the display 230, and the content may be provided by fading out and fading in.

Of the image contents, in a music video, a separate screen for storytelling may be added to an introduction part or a middle part of the music track. Accordingly, the music track of the music content may be different from that of the music content music video. For example, a part corresponding to 1 minute and 50 seconds of a specific music track may be a part corresponding to 1 minute 58 seconds of a music video of a specific music track. When a user inputs a music video reproducing command at 1 minute and 50 seconds, if the display device 200 simply reproduces a part corresponding to 1 minute and 50 seconds of the music track of the music video, a user cannot enjoy the continuous viewing experience of the music track.

Accordingly, the display device 200 may analyze a waveform of a reproducing music track and a waveform of a sound source of the music video, and compare the waveform similarity within a predetermined period. For example, the display device 200 may analyze a fast Fourier transform (FFT) waveform in a predetermined period where a sound source is being reproduced, search for a portion where a FFT waveform of the sound source of the music video coincides with a FFT waveform in a predetermined period where the sound source is reproduced, and output the portion as a sound source when reproducing the music video. Accordingly, even if a user changes a content to a music video content, the user can continuously watch a sound source. The above description is merely an example, and there are various ways of comparing a sound source with a sound source of the music video.

Figure 16:
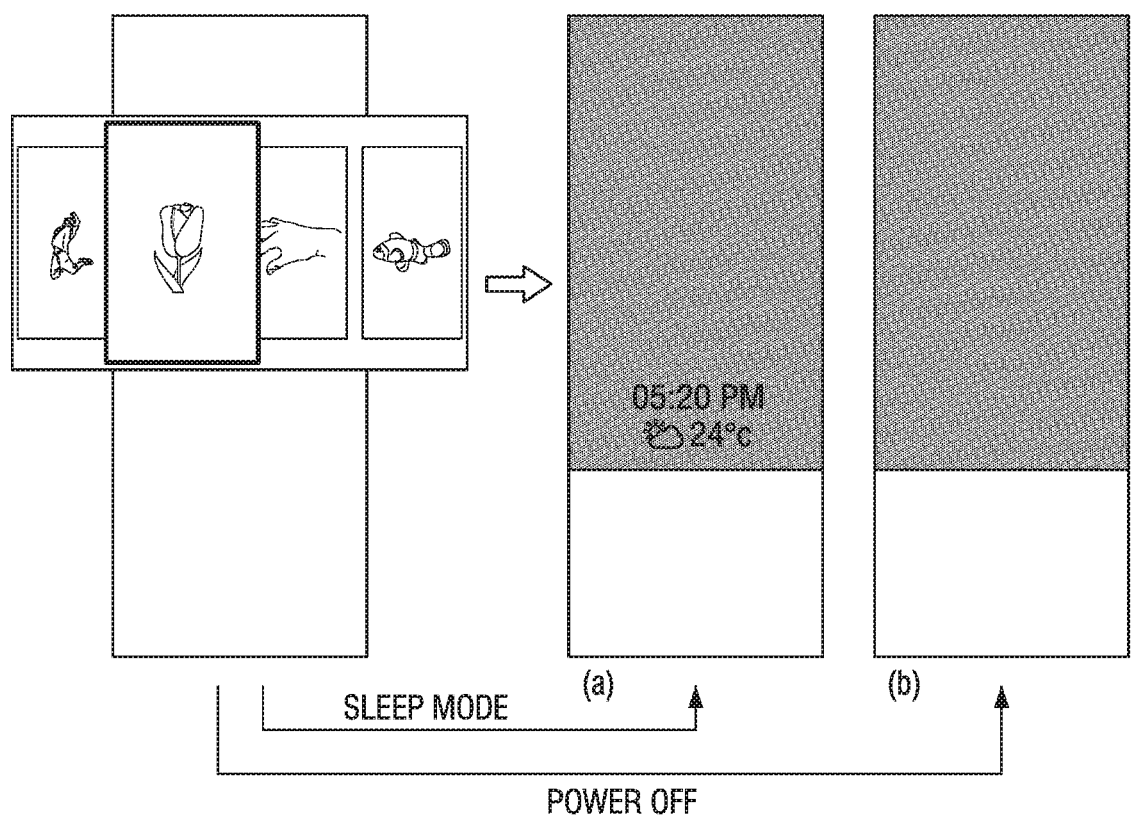
FIG. 16 is a view provided to explain a case where a display device is in a sleep/power-off mode according to an embodiment.

FIG. 16 is a view provided to explain a case where a display device is in a sleep/power-off mode.

Referring to FIG. 16, a mode of the display device 200 may be changed to a sleep mode when there is no user input for a predetermined period of time after the display device 200 is reproduced. In the sleep mode, the constituent elements except for the display 230, the remote control signal receiver 283, the communicator 220 and the processor 290 may be turned off, the display 230 may be maintained in a low quality mode, and the processor 290 may be maintained in a low power mode. The display device 200 may display weather, time, etc. in the sleep mode as shown in (a) of FIG. 16, but the present disclosure is not limited thereto. When a mode of the display device 200 is changed to a sleep mode, the display device 200 may rotate the display 230 in a horizontal direction to be disposed in a vertical direction through the rotation controller 245.

As described above, a mode of the display device 200 may be changed to the sleep mode when a user is not sensed for a predetermined period of time in addition to the case where there is no user input for a predetermined period of time. The display device 200 may detect that a user is near the display device 200 through the camera 281. When it is not detected that a user is nearby for a predetermined period of time through the camera 281, a mode of the display device 200 may be changed to the sleep mode.

In the sleep mode, the display device 200 may prevent unnecessary power consumption when a user does not use the display device 200 for a long period of time.

When a power-off command is received from a user, as shown in (b) of FIG. 16, the display device 200 may change a mode to a power-off mode where all constituent elements are turned off. In the same manner, when the display device 200 is rotated in a horizontal direction, the display device 200 may rotate the display 230 in a vertical direction through the rotation controller 245.

Figure 17:
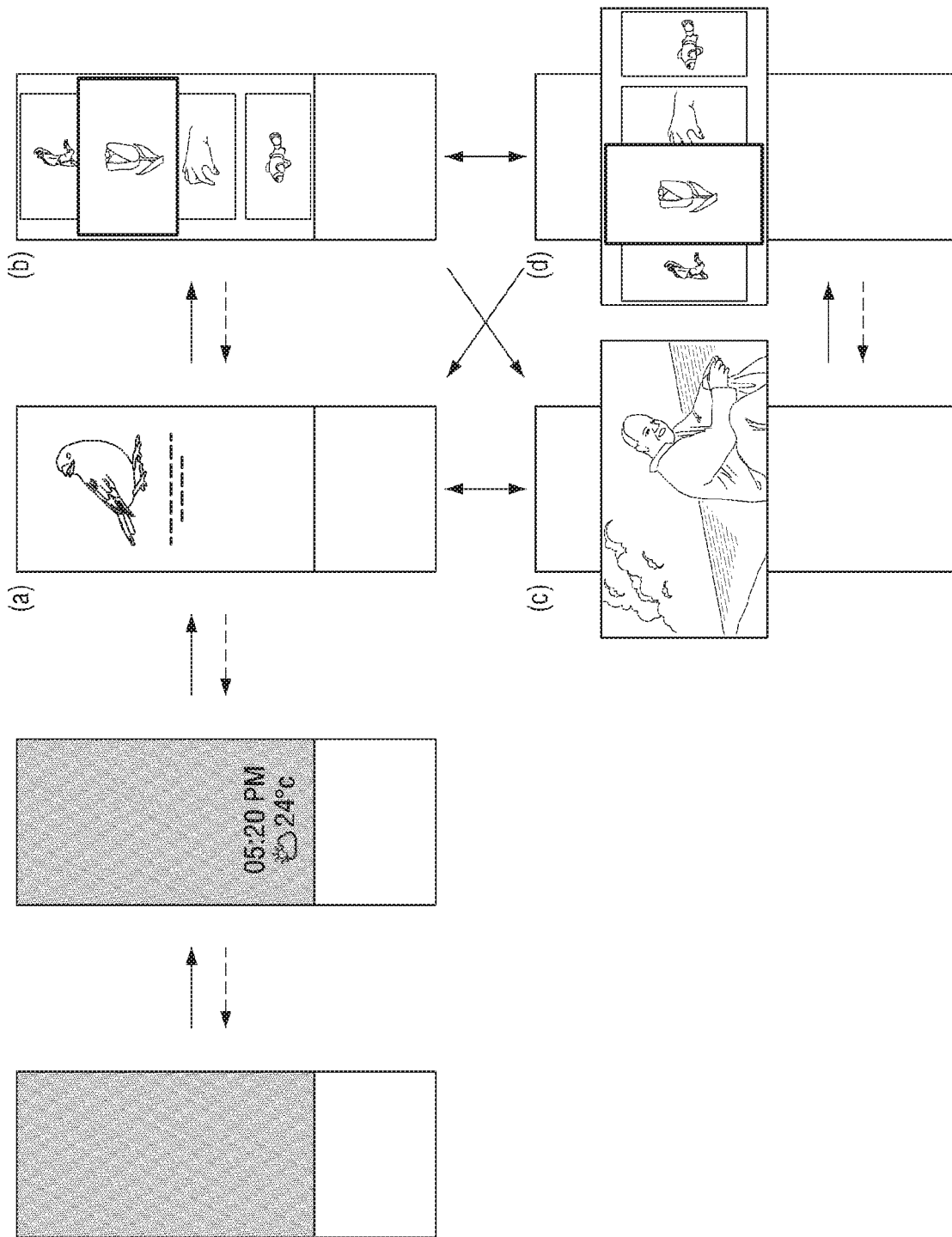
FIG. 17 is a view illustrating an overall operation of a display device according to an embodiment.

FIG. 17 is a view illustrating an overall operation of a display device 200.

When receiving a sleep button signal in a power off state, the display device 200 may change a mode to a sleep mode. When receiving a sleep button signal in a sleep mode once again or a button for another command, as shown in (a) of FIG. 17, a screen of the display device 200 may be changed to a screen displaying objects in a vertical direction. When receiving a home button signal, the display device 200 may display a plurality of objects in a vertical direction as shown in (b) of FIG. 17. When a content in a vertical direction is selected, the display device 200 may return to the state as shown in (a) of FIG. 17, and when a content in a horizontal direction is selected, the display device 200 may return to the state as shown in (c) of FIG. 17. In the same manner, when receiving a home button signal in the state as shown in (c) of FIG. 17, the display device 200 may return to the state as shown in (d) of FIG. 17.

Figure 18:
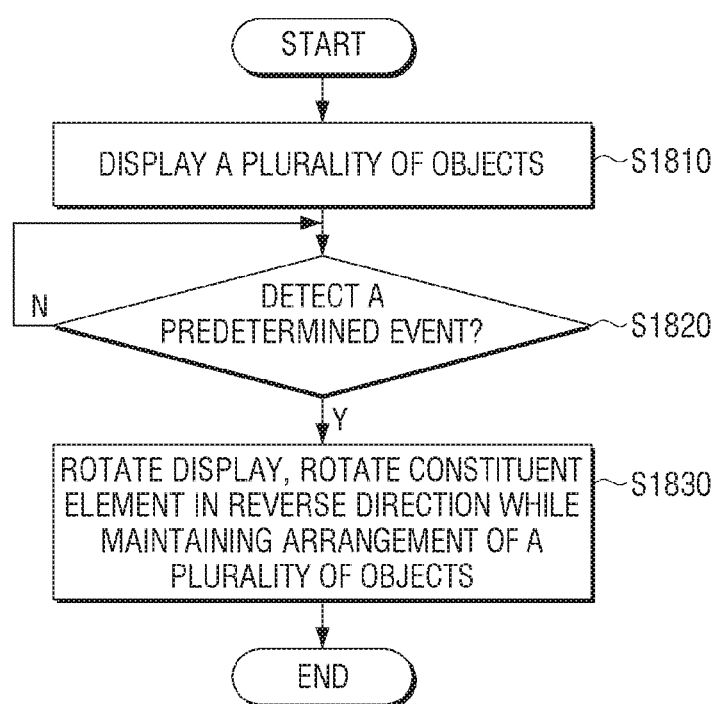
FIG. 18 is a flowchart provided to explain an embodiment.

FIG. 18 is a flowchart provided to explain an example embodiment.

Referring to FIG. 18, the display device 200 may display a plurality of objects on the display 230 at step S1810. When it is detected that a predetermined event occurs at step S1820-Y, the display device 200 may rotate the display in the first direction by a predetermined angle, and as the display rotates in the first direction, the display device 200 may rotate and display the constituent elements included in the plurality of objects in the second direction, which is a reverse direction to the first direction while maintaining the arrangement of the plurality of objects at step S1830. When the display device 200 does not detect a predetermined event at step S1820-N, the display device 200 may maintain a state where a plurality of objects are displayed until when a predetermined event is detected.

A device (e.g., modules or display device 200) or a method (e.g., operations) in accordance with various embodiments may be performed by at least one computer (e.g., a processor) which executes a one or more instructions included in at least one program among programs maintained by computer-readable storage media.

When the instructions are executed by a computer (e.g., a processor), the at least one computer may perform a function corresponding to the instructions. In this case, the computer-readable storage medium may be, for example, the memory 250.

The program may be stored in a non-transitory computer readable recording medium such as a hard disk, a floppy disk, a magnetic medium (e.g., a magnetic tape), an optical medium (e.g., a compact disc read only memory (CD-ROM)), a digital versatile discs (a DVD), magneto-optical media (e.g., a floptical disk), a hardware device (e.g., ROM, RAM, a flash memory, etc.). In this case, the storage medium may be generally included as part of the configuration of the display device 200, but it may be mounted through a port of the display device 200, or included in an external device outside the display device 200 (e.g., a cloud, a server, or other electronic device). The program may be divided into a plurality of storage media, and at least part of a plurality of storage media may be located in the external device of the display device 200.

The one or more instructions may include high-level language code that may be executed by a computer using an interpreter or the like as well as machine language code such as those generated by a compiler. The hardware devices described above may be configured to operate as one or more software modules to perform the operations of the various embodiments, and vice versa.

Although embodiments have been shown and described, it will be appreciated by those skilled in the art that changes may be made to these embodiments without departing from the principles and spirit of the present disclosure. Accordingly, the scope of the present disclosure is not limited to the described embodiments, but is defined by the appended claims as well as their equivalents.

What is claimed is:

1. A method of controlling a display device including a display, a base, and a motor, the method comprising:
    displaying a plurality of objects, a plurality of first elements positioned in each of the plurality of objects, and a plurality of second elements positioned in each of the plurality of objects on the display;
    based on an event occurring, controlling the motor to rotate the display relative to the base, from a vertical orientation to a horizontal orientation, in a first direction; and
    based on a rotation angle of the display changing in the first direction, rotating the plurality of first elements in a second direction, which is opposite to the first direction, fading out display of the plurality of second elements while rotating the plurality of second elements in the second direction to an intermediate angle, and, fading in display of the plurality of second elements while rotating the plurality of second elements in the second direction past the intermediate angle,
    wherein an opacity, an arrangement, and a display orientation of the plurality of objects are maintained while the plurality of first elements are rotated.

2. The method as claimed in claim 1, wherein the displaying comprises:
    based on an object of the plurality of objects being selected, highlighting the object; and
    based on the event occurring while the object of the plurality of objects is highlighted, rotating the display in the first direction by a predetermined angle while maintaining the object to be highlighted.

3. The method as claimed in claim 1, wherein the displaying comprises:
    based on an object of the plurality of objects being selected, displaying a first screen with respect to a selected object;
    based on the event occurring while the first screen is displayed, rotating the display in the first direction by a predetermined angle; and
    based on the display being rotated in the first direction, fading out the first screen and fading in a second screen with respect to the selected object.

4. The method as claimed in claim 3, wherein the displaying comprises fading out display of the first screen while rotating in the second direction, and fading in display of the second screen while rotating in the second direction.

5. The method as claimed in claim 3, further comprising, based on the selected object being a music related content, outputting audio related to the music related content,
    wherein one of the first screen and the second screen includes at least one of an album cover, an artist picture and lyrics associated with the music related content, and
    wherein another one of the first screen and the second screen includes an image content associated with the music related content.

6. The method as claimed in claim 1, further comprising, based on a user input not being sensed during a predetermined period of time while the plurality of objects are rotated and displayed in the first direction, rotating the display in the second direction, and changing a mode of the display device to a sleep mode.

7. The method as claimed in claim 1, wherein the rotating comprises rotating the display 90 degrees.

8. A display device comprising:
    a base;
    a display;
    a motor configured to rotate the display relative to the base; and
    a processor configured to:
        control the display to display a plurality of objects, a plurality of first elements in the plurality of objects, and a plurality of second elements positioned in each of the plurality of objects,
        based on an event occurring, control the motor to rotate the display in a first direction from a vertical orientation to a horizontal orientation,
        based on a rotation angle of the display changing in the first direction, rotate the plurality of first elements in a second direction, which is opposite to the first direction, and as the plurality of first elements rotate, fade out display of the plurality of second elements while rotating the plurality of second elements in the second direction to an intermediate angle, and fade in display of the plurality of second elements while rotating the plurality of second elements in the second direction past the intermediate angle, wherein an opacity, an arrangement, and a display orientation of the plurality of objects are maintained while the plurality of first elements are rotated.

9. The display device as claimed in claim 8, wherein the processor is further configured to, based on the display being rotated in the first direction, control the display to rotate and display the plurality of first elements respectively included in the plurality of objects in the second direction at a speed same as a rotation speed of the display.

10. The display device as claimed in claim 8, wherein the processor is further configured to: based on an object of the plurality of objects being selected, highlight the object, and based on the event occurring while the object of the plurality of objects is highlighted, control the motor to rotate the display in the first direction by a predetermined angle while maintaining the object to be highlighted.

11. The display device as claimed in claim 8, wherein the processor is further configured to:

based on an object of the plurality of objects being selected, control the display to display a first screen with respect to a selected object, based on the event occurring while the first screen is displayed, control the motor to rotate the display in the first direction by a predetermined angle, and based on the display being rotated in the first direction, control the display to fade out display of the first screen and fade in display of a second screen with respect to the selected object.

12. The display device as claimed in claim 8, wherein a horizontal length of the display is less than a vertical length of the display in the vertical orientation, and wherein the horizontal length is greater than the vertical length in the horizontal orientation.

13. The display device as claimed in claim 12, wherein the processor is further configured to maintain an orientation of each of the plurality of first elements, with respect to the base, while the display is rotated by the motor from the vertical orientation to the horizontal orientation.

14. A non-transitory computer readable recording medium having embodied thereon a program, which when executed by a processor of a display device including a display, a base, and a motor, causes the display device to execute a method including:

displaying a plurality of objects, a plurality of first elements in the plurality of objects, and a plurality of second elements positioned in each of the plurality of objects on the display;

based on an event occurring, controlling the motor to rotate the display relative to the base, from a vertical orientation to a horizontal orientation, in a first direction; and based on a rotation angle of the display changing in the first direction, rotating the plurality of first elements in a second direction which is opposite to the first direction, fading out display of the plurality of second elements while rotating the plurality of second elements in the second direction to an intermediate angle, and, fading in display of the plurality of second elements while rotating the plurality of second elements in the second direction past the intermediate angle, wherein an opacity, an arrangement, and a display orientation of the plurality of objects are maintained while the plurality of first elements are rotated.

15. The non-transitory computer readable recording medium in claim 14, wherein the displaying comprises:

based on an object of the plurality of objects being selected, highlighting the object; and based on the event occurring while the object of the plurality of objects is highlighted, rotating the display in the first direction by a predetermined angle while maintaining the object to be highlighted.

16. The non-transitory computer readable recording medium in claim 14, wherein the displaying comprises:

based on an object of the plurality of objects being selected, displaying a first screen with respect to a selected object;

based on the event occurring while the first screen is displayed, rotating the display in the first direction by a predetermined angle; and based on the display being rotated in the first direction, fading out the first screen and fading in a second screen with respect to the selected object.

* * * * *